United States Patent
Thiel et al.

(10) Patent No.: US 10,970,317 B2
(45) Date of Patent: Apr. 6, 2021

(54) SYSTEM AND METHOD OF A TWO-STEP OBJECT DATA PROCESSING BY A VEHICLE AND A SERVER DATABASE FOR GENERATING, UPDATING AND DELIVERING A PRECISION ROAD PROPERTY DATABASE

(71) Applicant: Continental Automotive GmbH, Hannover (DE)

(72) Inventors: Christian Thiel, Oberaudorf (DE); Paul Barnard, Stoke St. Michael (GB); James Herbst, Chicago, IL (US); Ralf Johannes Lenninger, Regensburg (DE); Frank Foersterling, Steinkirchen (DE)

(73) Assignee: CONTINENTAL AUTOMOTIVE GMBH

( * ) Notice: Subject to any disclaimer, the term of this patent is extended or adjusted under 35 U.S.C. 154(b) by 226 days.

(21) Appl. No.: 15/751,850

(22) PCT Filed: Jul. 28, 2016

(86) PCT No.: PCT/EP2016/068003
§ 371 (c)(1),
(2) Date: Feb. 10, 2018

(87) PCT Pub. No.: WO2017/025341
PCT Pub. Date: Feb. 16, 2017

(65) Prior Publication Data
US 2018/0246907 A1    Aug. 30, 2018

(30) Foreign Application Priority Data
Aug. 11, 2015 (EP) .................... 15180617

(51) Int. Cl.
*G06F 16/00* (2019.01)
*G06F 16/29* (2019.01)
(Continued)

(52) U.S. Cl.
CPC ............. *G06F 16/29* (2019.01); *G01C 21/32* (2013.01); *G06K 9/00805* (2013.01); *H04W 4/44* (2018.02)

(58) Field of Classification Search
CPC ... G06F 16/29; G06F 16/215; G06K 9/00805; H04W 4/44; G01C 21/32
(Continued)

(56) References Cited

U.S. PATENT DOCUMENTS 4,796,191 A * 1/1989 Honey .................. G01C 21/14
701/445
6,032,098 A    2/2000 Takahashi et al.
(Continued)

FOREIGN PATENT DOCUMENTS

CA    2712673 A1    8/2009
CA    2749685 A1    5/2010
(Continued)

OTHER PUBLICATIONS

English Translation of DE 10030932 A1 "Cited in a previous IDS".
(Continued)

*Primary Examiner* — Vincent F Boccio
(74) *Attorney, Agent, or Firm* — Yakov Sidorin; Quarles & Brady LLP

(57) ABSTRACT

A method and a system of a two-step object data processing by a vehicle and a database for generating and updating a digital road description database containing object-based information about road objects is disclosed. First, the server database comprises fourth data sets and generates and forwards first data sets to the vehicle, which are related to the
(Continued)

area of interest of the vehicle. The vehicle is collecting a plurality of ambient data sets at least along a specific section of its path. It is performing the first step of object data processing by evaluating a selection of the plurality of ambient data sets and generating at least one second data set comprising at least location information and detailed object-based information. It further generates third data sets containing differences between the object-based information of the second data sets and the object-based information of the first data sets and forwards the third data sets to the server database. The server database performs the second step of object data processing comprising at least statistical evaluation and post processing to update the fourth data sets in the server database based on the third data sets.

18 Claims, 19 Drawing Sheets

(51) Int. Cl.
    *G01C 21/32*     (2006.01)
    *H04W 4/44*     (2018.01)
    *G06K 9/00*     (2006.01)

(58) Field of Classification Search
    USPC .......................................................... 707/724
    See application file for complete search history.

(56) References Cited

U.S. PATENT DOCUMENTS

| | | | |
|---|---|---|---|
| 6,047,234 | A | 4/2000 | Cherveny et al. |
| 6,161,071 | A | 12/2000 | Shuman et al. |
| 6,173,231 | B1 | 1/2001 | Chojnacki |
| 6,353,785 | B1 | 3/2002 | Shuman et al. |
| 6,366,851 | B1 | 4/2002 | Chojnacki et al. |
| 6,546,330 | B2 | 4/2003 | Fushiki et al. |
| 6,577,937 | B1 | 6/2003 | Shuman et al. |
| 6,675,081 | B2 | 1/2004 | Shuman et al. |
| 6,853,913 | B2 | 2/2005 | Cherveny et al. |
| 7,382,244 | B1 | 6/2008 | Donovan et al. |
| 7,552,008 | B2 | 6/2009 | Newstrom et al. |
| 7,613,564 | B2 | 11/2009 | Vorona |
| 7,714,705 | B2 | 5/2010 | Rennie et al. |
| 7,840,326 | B1 | 11/2010 | Yamada |
| 8,275,522 | B1 | 9/2012 | Groeneweg et al. |
| 8,417,442 | B2 | 4/2013 | Johnson et al. |
| 8,738,197 | B2 | 5/2014 | An et al. |
| 8,755,990 | B2 | 6/2014 | Johnson et al. |
| 8,855,923 | B2 | 10/2014 | Haavasoja |
| 9,346,400 | B2 * | 5/2016 | Attard ........................ B60R 1/00 |
| 2005/0043884 | A1 | 2/2005 | Atarashi |
| 2005/0149259 | A1 | 7/2005 | Cherveny et al. |
| 2007/0124064 | A1 | 5/2007 | Fukui et al. |
| 2008/0051997 | A1 | 2/2008 | Rosenberg |
| 2008/0243378 | A1 | 10/2008 | Zavoli |
| 2009/0125234 | A1 | 5/2009 | Geelen et al. |
| 2009/0228204 | A1 | 9/2009 | Zavoli et al. |
| 2009/0254241 | A1 | 10/2009 | Basir |
| 2009/0276153 | A1 | 11/2009 | Lee |
| 2010/0014712 | A1 | 1/2010 | Sampedro Diaz et al. |
| 2011/0307169 | A1 | 12/2011 | Shimizu et al. |
| 2012/0083995 | A1 | 4/2012 | Vorona |
| 2012/0135745 | A1 | 5/2012 | Kaplan |
| 2012/0203428 | A1 | 8/2012 | Choi et al. |
| 2013/0147661 | A1 | 6/2013 | Kangas et al. |
| 2013/0154854 | A1 | 6/2013 | Chen et al. |
| 2014/0002277 | A1 | 1/2014 | Fulger et al. |
| 2014/0160295 | A1 | 6/2014 | Kyomitsu et al. |
| 2014/0163768 | A1 | 6/2014 | Purdy et al. |
| 2014/0278026 | A1 | 9/2014 | Taylor |
| 2014/0278331 | A1 | 9/2014 | Mewes et al. |
| 2014/0324326 | A1 | 10/2014 | Taylor |
| 2014/0350832 | A1 | 11/2014 | Johnson et al. |
| 2015/0012165 | A1 | 1/2015 | Israelsson |
| 2015/0073705 | A1 | 3/2015 | Hiwatashi |
| 2015/0175070 | A1 * | 6/2015 | Attard ............... B60W 60/0053 340/439 |

FOREIGN PATENT DOCUMENTS

| | | | |
|---|---|---|---|
| CA | 2832568 | A1 | 10/2012 |
| DE | 10030932 | A1 | 1/2002 |
| DE | 10055287 | B4 | 9/2005 |
| DE | 102004047122 | A1 | 4/2006 |
| DE | 19604083 | B4 | 6/2006 |
| DE | 102006053484 | A1 | 5/2008 |
| DE | 102004050597 | B4 | 2/2009 |
| DE | 102009017731 | A1 | 11/2009 |
| DE | 102011083378 | A1 | 3/2013 |
| DE | 102011085287 | A1 | 5/2013 |
| DE | 102013007171 | A1 | 12/2013 |
| EP | 0921509 | A2 | 6/1999 |
| EP | 0921509 | B1 | 4/2004 |
| EP | 1219928 | B1 | 10/2006 |
| EP | 1111338 | B1 | 2/2009 |
| EP | 1566665 | B1 | 8/2010 |
| EP | 1930694 | B8 | 3/2013 |
| EP | 2148172 | B1 | 9/2013 |
| EP | 2535883 | B1 | 3/2014 |
| EP | 2757539 | A1 | 7/2014 |
| EP | 1098168 | B1 | 10/2014 |
| EP | 2821307 | A1 | 1/2015 |
| JP | H11249552 | A | 9/1999 |
| JP | 2005337871 | A | 12/2005 |
| JP | 2010507821 | A | 3/2010 |
| JP | 2012002595 | A | 1/2012 |
| JP | 2015052548 | A | 3/2015 |
| WO | 2005073926 | A1 | 8/2005 |
| WO | 2008118578 | A9 | 11/2008 |
| WO | 2009059766 | A1 | 5/2009 |
| WO | 2009098154 | A1 | 8/2009 |
| WO | 2010040404 | A1 | 4/2010 |
| WO | 2010068185 | A1 | 6/2010 |
| WO | 2010134824 | A1 | 11/2010 |
| WO | 2011008316 | A1 | 1/2011 |
| WO | 2011067472 | A1 | 6/2011 |
| WO | 2012129424 | A2 | 9/2012 |
| WO | 2013050188 | A1 | 4/2013 |
| WO | 2013173911 | A1 | 11/2013 |
| WO | 2014166532 | A1 | 10/2014 |

OTHER PUBLICATIONS

English Translation of DE 10055287B4 "Cited in a previous IDS".
English Translation of DE 19604083 B4 "Cited in a previous IDS".
English Translation of DE 102004047122 A1 "Cited in a previous IDS".
English Translation of DE 102004050597 B4 "Cited in a previous IDS".
English Translation of DE 102006053484 A1 "Cited in a previous IDS".
English Translation of DE 102009017731 A "Cited in a previous IDS".
English Translation of DE 102011083378 A1 "Cited in a previous IDS".
English Translation of DE 102011085287 A1 "Cited in a previous IDS".
English Translation of DE 102013007171 A1 "Cited in a previous IDS".
English Translation of EP 1219928 B1 "Cited in a previous IDS".
English Translation of EP 2148172 B1 "Cited in a previous IDS".
English Translation of JP 2010507821 A "Cited in a previous IDS".
English Translation of JP 2015052548 A "Cited in a previous IDS".
English Translation of JPH 11249552 A "Cited in a previous IDS".
English Translation of WO 2013050188 A1 "Cited in a previous IDS".
Jaejun Yoo et al, "Vehicular image based geographic informationsystem for telematics environments—integrating map world into real world"

(56) References Cited

OTHER PUBLICATIONS

Geoscience and Remote Sensing Symposium, 2005. IGARSS '05 Proceesings. 2005 IEEE International Seoul, Korea Jul. 25-29, 2005, Piscataway, NJ, USA. IEEE. vol. 2, Jul. 25, 2005 (Jul. 25, 2005), pp. 1206-1209, XP010848350, DOI: 10.1109/IGARSS.2005. 1525334 ISBN: 978-0-7803-9050-8, the whole document.
Search Report dated Jan. 21, 2016 for corresponding European Patent Application No. 15180617.1.
Examination Report dated Feb. 23, 2016 for corresponding European Patent Application No. 15180617.1.
International Search Report and Written Opinion dated Oct. 27, 2016 from corresponding International Patent Application No. PCT/EP2016/068003.

\* cited by examiner

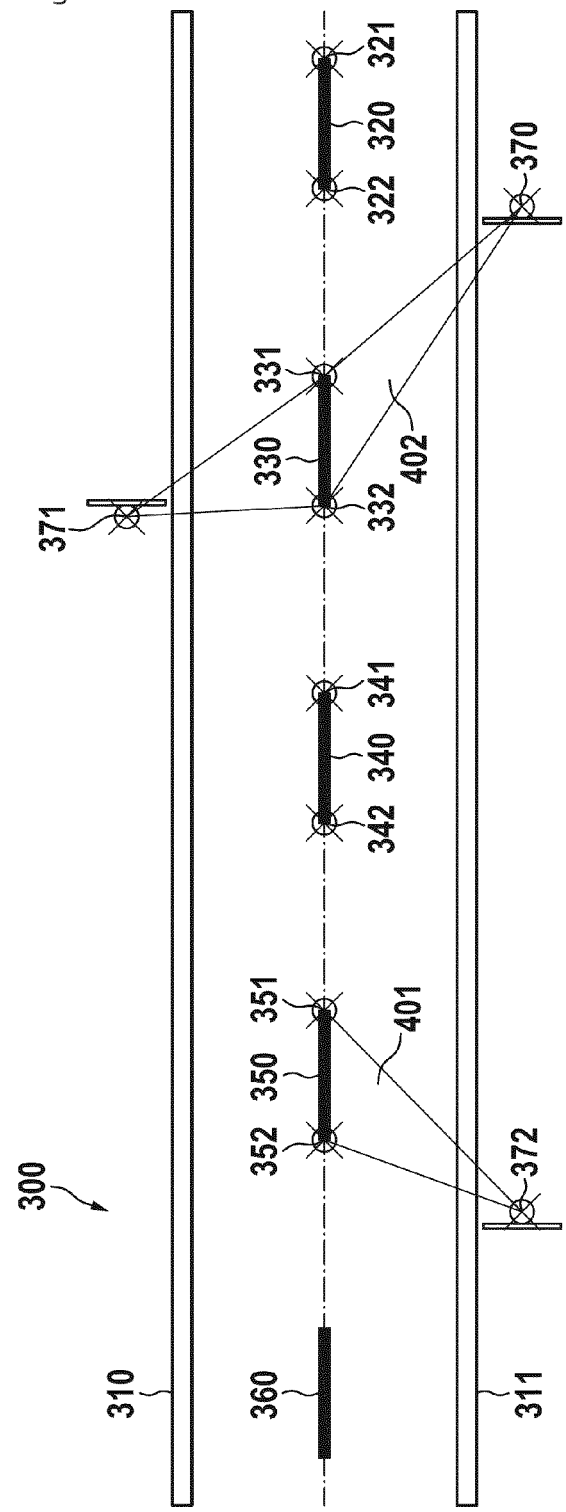

SYSTEM AND METHOD OF A TWO-STEP OBJECT DATA PROCESSING BY A VEHICLE AND A SERVER DATABASE FOR GENERATING, UPDATING AND DELIVERING A PRECISION ROAD PROPERTY DATABASE

FIELD OF THE INVENTION

The invention relates to a method and a system for collecting road data and environmental data of the vicinity of a road. There is a two-step object data generation and processing shared between a vehicle and a server database for generating data sets comprising driving-relevant object data. It further relates to a database containing such data, a method for building such a database and a method for distributing such data to vehicles.

DESCRIPTION OF THE RELATED ART

For enhancing the operation of vehicles and for providing new features and functions an increasing number of sensors and processors or computers are integrated in modern vehicles. In U.S. Pat. No. 6,353,785 B1, a method and system for in-vehicle computer architecture is disclosed. The computing architecture includes a data network comprised of a plurality of interconnected processors, a first group of sensors responsive to environmental conditions around the vehicle, a second group of sensors responsive to the vehicle's hardware systems, and a map database containing data that represent geographic features in the geographic area around the vehicle. The vehicle operations programming applications may include adaptive cruise control, automated mayday, and obstacle and collision warning systems, among others. In this embodiment, the vehicle needs a continuous communication over a data network which may sometimes be interrupted under real road conditions. Furthermore, a precise map database is required.

EP 1 219 928 A1 shows a method for generating road segments for a digital map. A vehicle equipped with a camera is driving over a road section. The captured images are correlated with GPS information to produce a digital map.

To generate road maps, highly specialized vehicles are used. They have expensive equipment for scanning roads which may cost significantly more than the vehicle itself. After scanning the roads, manual processing of the acquired information is required. This is expensive, labour intensive and prone to errors. Therefore, only comparatively long update cycles can be achieved.

SUMMARY OF THE INVENTION

The problem to be solved by the invention is to improve the known vehicles, databases and methods for building databases which further provide sufficient information to vehicles to enable Highly Automated Driving (HAD), or autonomous driving, or self-driving, or other vehicle control applications, or precision vehicle positioning.

Solutions of the problem are described in the independent claims. The dependent claims relate to further improvements of the invention.

Tests and simulations with HAD and self-driving vehicles have shown that a very detailed knowledge of the vehicle's environment and specifically of the road is required. Such data may be used for a plurality of other applications like high-beam assist, speed advisor, bump/pothole warning, economic driving, smart cruise control, advanced shifting, accelerator force feedback pedal, smart energy management, damping control, advanced retarder control, cooling strategy, emergency steering assist, preview ESC, intelligent parking, traffic light assist and curve speed warning. Therefore, it is desirable to provide fresh and up-to date data of the road and other driving-relevant objects at moderate or low cost.

Such data is preferably based on data acquired by sensors in the vehicle. But it would be desirable to have road information beyond the reach of the sensors, for example in a long distance or behind a curve. Such information may allow a proactive control of the vehicle. If for example, the vehicle is approaching an intersection behind a curve, the speed of the vehicle may be reduced, or a different gear may be selected prior to an inclining road.

Furthermore, such sensors may be impaired by internal errors or by environmental conditions. For example, a camera tracking the road, may be impaired by fog or heavy rain. In such a case, it would be desirable to have detailed information about the road which allows to correlate the captured camera image with the known information. This way it may be possible to interpret information in a correct way, which otherwise would be hard to recognize. If, for example, the vehicle knows precisely the positions of each dash of a dashed centreline and its exact distance to the border of the road, a positioning may still be possible, even if the camera image is extremely noisy and the centreline dashes are hard to detect.

If sufficiently detailed, fresh and reliable information about the road and other driving-relevant objects is available, the field of use of the above mentioned vehicle applications may be broadened or the requirements on the vehicles' sensors may be lowered and vehicles may be equipped with less or cheaper sensors. Furthermore, driving may be possible with failed or impaired sensors.

Conventional digital maps of the road, which are used today in conjunction with GNSS tracking of vehicle movements may be sufficient for navigation, but they are not detailed enough for self-driving vehicles. Scanning the roads with specialized scanning vehicles provides much more details, but is extremely complex, time-consuming and expensive. Therefore, there are large update intervals which may reach an order of years. From a global view, the road infrastructure itself does not change quickly, as road construction is expensive and time-consuming. A road between any two points will remain for a long period, but road details may change quickly. Therefore, it is desired to provide sufficiently detailed and precise road information or road property data in a timely manner.

The basic concept of a preferred embodiment of generating and updating a precision road property database is a two-step object data processing, whereby a first object data processing step is done by a vehicle and a second object data processing step is done by a server database.

In a first embodiment, a standard production vehicle uses its sensors to collect a plurality of ambient data sets, processes them and communicates with a precision road property database on a server to improve the quality of its collected data and to provide the server database updated ambient information. Generally, the information is mostly object-based and related to driving-relevant objects like a road object, a road furniture object, a geographic object or a further object. A road object preferably is related to a road itself. It may describe basic characteristics of a road like the width, the direction, the curvature, the number of lanes in each direction, the width of lanes, the surface structure. It may further describe specific details like a curb stone, a centreline, even a single dash of a dashed centreline or other markings like a crosswalk or a stop line. A road furniture object is related to road furniture, also called street furniture. Road furniture may comprise objects and pieces of equipment installed on streets and roads for various purposes. It may include benches, traffic barriers, bollards, post boxes, phone boxes, streetlamps, traffic lights, traffic signs, bus stops, tram stops, taxi stands, public sculptures, and waste receptacles. A geographic object may be any stationary object like but not limited to a building, a river, a lake or a mountain. Further objects may be objects which are not falling into one of the above categories, but are also relevant for driving. Such objects may be trees, stones, walls or other obstacles close to a road. They may also comprise structures like trenches, plane surfaces and others which may be considered for planning alternate, emergency exit or collision avoidance paths.

The vehicle may be a car, a truck, a motorbike or any other means for traveling on a road along a path. The embodiments are described herein by example of a vehicle, but they are generally applicable to a plurality of vehicles. A vehicle preferably has a number of sensors like, but not limited to a camera system like a CCD camera which may be suitable for capturing visible and/or infrared images. Preferably a simple mono-camera is provided. Alternatively, a stereo camera, which may have two imaging sensors mounted distant from each other may be used. There may be further sensors like radar sensors, laser sensors, infrared sensors, ultrasound transducers or other environmental sensors. Although it is preferred that the sensors are oriented to the driving direction, they may be oriented to other directions like sideward or to the rear of the vehicle. It is further preferred that the vehicle has at least one computer or a plurality of computers, together with memory and software for performing the methods described herein. Most preferably a computer has enough processing power and memory for processing the sensor signals. Furthermore, the vehicle preferably has communication means for communicating over a communication network which may be, for example but is not limited to, a mobile communications network, Wi-Fi, satellite radio or any other type of network, which may even be a cable network. In general, communication between the vehicle and the server database is established by such communication means. The vehicle may use different communication means dependent on availability or cost, like a mobile communications network on route and Wi-Fi close to hotspots or at home.

The precision road property database further referred to as server database if not otherwise mentioned, preferably is provided by a service provider and preferably is hosted on a plurality of host computer systems. It may be a central database, but preferably it is split into a plurality of sub databases, which for example are divided by geographic regions. Preferably, a database manager is connected to the server database. Most preferably, the database manager comprises a plurality of sub-managers connected to sub databases. Preferably, the server database has a suitable network connection like an Internet connection to communicate with the vehicle. In an alternate embodiment, the communication with the vehicles may be performed via third party communication systems like back ends of vehicle manufacturers. The bandwidth should be large enough to communicate with a large number of vehicles simultaneously. Preferably, the communication is compressed and/or encrypted. Preferably, the server database comprises a physical data storage which may be in specific server locations, in a cloud based shared infrastructure, a combination of approaches or similar embodiment, together with a software for managing data storage and data flow. Herein, the term server database is used meaning all related systems in a broad sense. This may include a computer system, a physical storage or a cloud based shared infrastructure, a database engine, a database manager and further software for processing data in the database or similar embodiment.

Preferably, the vehicle gets road property data before driving autonomously and stores it in a vehicle database. An initial data set may be supplied by a vehicle manufacturer during a manufacturing or initial initialization procedure of the vehicle, by a data storage medium like a CD, DVD, hard disk, portable memory, or by download from the server database. As the initial data set may be comparatively large, it is preferred to have a high-speed data connection available for an initial download from the server database. Preferably, the initial data set covers an area or region in which the vehicle may operate in the near future. After the initial data set has been received, the vehicle may require further updates. Such updates may provide new information about changed objects and/or an extension or change of the previously covered area. The vehicle may request such updates from the server database in certain intervals and/or if a high speed network connection is available and/or if an extension of coverage is required, which may be the case after a new route has been planned or even during driving. The server database may also trigger a data transfer to the vehicle based on its knowledge, which data may be required by the vehicle. Such data preferably is updated and/or urgent data which may include warnings of dangerous road conditions.

For providing initial or ongoing data sets to a vehicle, the server database generates at least one first data set from fourth data sets stored in the server database. The at least one first data set is related to the request by the vehicle or the trigger by the server database. Preferably, the first data set covers an area of interest for the vehicle. Such an area of interest may be modified by the server database or the vehicle over the time of the vehicle's use. Preferably, the path driven by the vehicle is part of its area of interest. Preferably, the server database has stored information about the status of the vehicle database. Such information may comprise a copy of the first data sets stored in the vehicle or at least one identifier for identifying the first data sets stored in the vehicle. This status information is preferably updated after the vehicle has confirmed reception of first data sets. By using this status information, the first data set may only comprise amended data sets and/or new data sets. There may be data sets which the vehicle does not have, data sets, which the vehicle has, but which are updated, data sets, which the vehicle has, but which are retransmitted, or data sets which the server database wants the vehicle to delete. If triggered by the server database, the at least one first data set may contain updated data and/or warning data and/or data which should be verified by the vehicle. Preferably, each first data set comprises at least one location information and detailed object-based information. The location information specifies a position, an area or region to which the detailed object based information is applicable. This includes, that a data set may comprise one location information and a plurality of object-based information which preferably relate to the same or adjacent locations. The object based information may comprise detailed information about at least one driving-relevant object like a road object, a road furniture object and a geographic object.

Preferably, the data sets provided by the server database to vehicles and from vehicles to the server database comprise an object-based 3D vector format. Most preferably, the first, second, third and fourth data sets comprise such a vector format. Such a vector format may be a vector graphics format, preferably like a standard vector graphics format as used in computer game or CAD drawing technologies or a derivative thereof. Preferably, detailed objects of a road like limits of the road, markings of the road, inter-sections and exits as well as street furniture are represented in a 3D vector graphics format. Due to a vector graphics format, only low volumes of data have to be transferred between a vehicle and a server database and back. Also, a vector graphics format allows to render the road property data in different ways, to represent different viewing angles or sensor styles such as camera-like or radar-like.

Preferably, the server database supplies auxiliary information to the vehicle as part of the first data sets. Such auxiliary information may be a server database generated confidence level or other confidence related information, herein called confidence level, and importance level, and urgency level or statistical information like average values and standard deviations. This auxiliary information may be supplied for each individual data set or for a group of data sets.

After the first data sets have been generated, they are forwarded to the vehicle and stored in the vehicle database. From the vehicle database, the vehicle can derive driving-relevant data for its driving control applications like highly automated driving.

But vehicles are not only consumers of road property data. They also generate road property data by analysing ambient data sets collected by their sensors. Under normal road and driving conditions, it may be preferred, if vehicles sample or collect information by their sensors, preferably also by their image sensors while driving, while participating in traffic or at least while being on the road or in proximity to a road and compare and/or correlate the sampled information with the previously downloaded or stored information on a regular or periodic base. The frequency or time intervals between such collections, which may also be called sampling rate, may be determined by the sensors in the vehicle, their resolution and/or the processing power in the vehicle. Instead of periodic sampling, random sampling may be chosen. The frequency of sampling may also be adapted to the environment. In the case of a curvy road, a higher sampling rate may be desired compared to a straight road. Different sapling rates may also be requested by the server database.

The sampled ambient data sets may be recorded and stored over a certain time as a sequence of ambient data sets. This allows to process the stored ambient data sets as a background task and to move back and forth through the stored data sets for more sophisticated processing in contrast to real-time processing which has to follow the vehicle at speed. Storage of a sequence of sampled ambient data sets allows the vehicle specifically when driving, to monitor for the objects appearance over time and/or distance. For example, a traffic sign may be a small spot on an image taken by a camera from a large distance. When approaching the traffic sign, this spot increases and starts to show a characteristic pattern until it can be seen clearly in a close up view shortly before passing the traffic sign.

A continuous recording of ambient data sets at least over a certain time interval may also allow a view-back. In the above example, the vehicle may have identified the traffic sign just before passing the traffic sign. It is now possible to roll back the ambient data sets, such as images, when approaching the traffic sign and to generate further information how such a traffic sign looks like from a distant approach or where it is exactly located. This data may also be used as part of the driving-relevant data to enable vehicles to detect the traffic sign from a larger distance.

The server database may transmit a sampling request message, which preferably specifies the time and/or location of which information should be sampled. Furthermore, the server database may request a special processing of a specific object or area. For example, it may request text or language processing of a traffic sign. It may further request a high resolution image of an unknown area, for example a traffic sign, such that the server database itself may do additional processing such as text recognition in a foreign language. Special requests may preferably be addressed to specific vehicles which may have specific equipment for example like a stereo camera or a laser scanner or which move in a certain region. The server database may also upload specific processing instructions or specific program code. Such special processing requests may be contained within at least one first data set, either as implicit instructions or by means of parameters or data. For example, a low confidence level would trigger a rescan of an object to get better information and therefore to increase the confidence level.

Sampling may also be triggered based on confidence and/or importance and/or urgency levels. If a first data set in the vehicle database shows a comparatively low confidence level or a high importance and/or urgency level at a certain location, it would be preferred, if a large number or almost all vehicles passing or staying at that location would collect information by their sensors and forward updates to the server database. Over time, an increasing number of data is collected which leads to a higher confidence level. As it may not be necessary to rescan objects with a higher confidence level, the number of rescanned objects decreases with time. Accordingly, the network traffic and the required processing power in the vehicle and the server database may decrease.

Furthermore, there may be a priority scheme to better utilize less-expensive communication networks if a high number of vehicles are transmitting updates at the same time. If for example, the confidence level of a data set is comparatively low and the sensors deliver improved data, the vehicle may record such data. If the confidence level is very high, only a low number of differences may be recorded. In such a case, the server database may further increase the confidence level. If the data already has a maximum confidence level, the vehicle will not record further data in that area. Instead it may generate at least one confirmation data set or send a confirmation message to the server database about passing a certain road section without having identified any differences. This way, the communication volume and thus communication cost may decrease with growing confidence in the data.

The processing power in some vehicles may not be sufficient to do a real-time comparison of data provided by the vehicle database and the data acquired by the vehicle's sensors for the complete vehicle path driven, at least with high frame rates, which may be adequate for high speed driving vehicles. A vehicle, which is driving at 120 km/h proceeds with 33.3 m/s. To get a spatial resolution of a sequence of ambient data sets of about 1 m, 33.3 ambient data sets must be processed per second. Comparing the vehicle database information with the ambient data sets in parallel to other driving-related tasks, may overburden most vehicle's computers, in particular as a single ambient data set may comprise a large number of information of a plurality of sensors like cameras, radar sensors, infrared or RF sensors and more, like other environmental sensors. Therefore, the comparison is preferably done in larger, discontinuous sections of the vehicle's path, as can be handled by each vehicle. The length of the vehicle path sections may be in a range from a few metres to some hundred metres and follow each other with a gap of a few metres to some hundred metres, which may further depend on a vehicle's speed or the currently available processing power. In a further embodiment, the evaluation of different information may be made independently. For example, visible camera images may be evaluated in real time, while laser scanned images may be evaluated at a later time. In a further embodiment, a certain level of evaluation of information may be done close to real-time, following the vehicle at speed, while a more detailed evaluation of information may only be done if differences are detected.

All or at least a selection as mentioned above of the road ambient data sets collected by the sensors are further evaluated to generate at least one second data set by the vehicle, each second data set comprising at least location information and detailed object-based information about at least one of a road object, a road furniture object and a geographic object. To generate such second data sets, the stored ambient data sets are evaluated. Preferably, the vehicle identifies driving-relevant objects either by the stored ambient data sets alone or by correlation of the stored ambient data sets with the information from at least one first data set as stored in the vehicle database. Such a correlation may be useful, if an object is hard to identify, which may for example be caused by a poor viewing angle, poor weather conditions or if the object is at least partially hidden. Preferably, the vehicle uses advanced techniques for increasing the object description accuracy like statistical evaluation or grouping of objects which will be described later in more detail. The second data sets represent the current view of the driving-relevant objects by the vehicle. Generating at least one second data set and/or generating at least one third data set is the first object data processing step which is done by the vehicle.

After generating the second data sets, the vehicle generates third data sets containing differences between the object-based information of the second data sets and the object-based information of the first data sets as stored in the vehicle database. Additionally or instead, at least one third data set may comprise a second data set without a calculated difference. Furthermore, third data sets may contain partial ambient data sets, complete ambient data sets, sequences of ambient data sets and other auxiliary information from sensors and the vehicle status as well as intermediate processing results. Preferably, the area of coverage of the third data sets is limited as requested by the server database or as determined by the vehicle. This selection has been described above in detail. It is further preferred to generate only such third data sets, when there are at least a minimum of differences between the object-based information of the second data sets and the object-based information of the first data sets, except such data sets have been expressly requested by the server database. As an alternative to not generating certain data sets, the data sets may still be generated but marked that no transmission to the server database should be made. If the vehicle has identified important data and generated at least one second data set without a corresponding first data set, it may be assumed, that the vehicle has identified a new object. Preferably, third data sets are always generated for such new objects. The third data sets may contain auxiliary data which may give further information like a vehicle generated confidence level. Such a vehicle generated confidence level may be determined by the vehicle based on the equipment of the vehicle, traveling speed, number of measurements or images or on a signal to noise ratio or any other measurement parameter. There may be further parameters to influence the vehicle generated confidence level like weather conditions, visibility conditions, light conditions, shadow, blinding and others.

Finally, the vehicle forwards the third data sets to the server database. Communication with the server database may be done according to the availability of a communication network. So communication may, for example, be done when a vehicle is parked or stops at a traffic light and Wi-Fi is available. Important and/or urgent data may always be exchanged via a mobile communications network, while other data may be exchanged at a later time when Wi-Fi is available. As the third data sets mainly comprise object data of driving-relevant objects, they are comparatively compact and require less size than images taken from the road or the objects. This significantly simplifies communication and reduces network load. Only in very special cases, larger image data may be transferred to the server database. For example, if a traffic sign is not readable, an image of this traffic sign may be forwarded to the server database for further evaluation.

The steps mentioned above may either be performed in sequence, processing a certain quantity of data sets step by step or by processing individual data sets. For example, data of a certain section of the vehicle's path may be collected and processed step by step after the path section has been passed by the vehicle. Instead, data processing may be made continuously while the vehicle is passing a certain section of its path. Furthermore, data may be continuously forwarded to the server database or in bursts. Also a combination may be possible. For example there may be a continuous real-time processing when the vehicle is passing a certain section of its path, while recording all relevant sensor data, allowing a view back as described above, if the vehicle detects an important object.

Preferably, a selection of the received third data sets are stored by the server database. Alternatively, all received third data sets are stored by the server database. Preferably, there is a large number of third data sets for each road stored in the server database. This may be like a history showing the results of previous third data sets from different vehicles for the road. The server database has at least fourth and third data sets available for further evaluation. The server database or a database manager which may be part thereof may review the third data sets received from the vehicles about differences to the fourth data sets. The server database tries to fit the third data sets to the fourth data sets. Normally, the location information of the objects of third data sets should be in close proximity to the fourth data sets. There may be a deviation in an order of the maximum GNSS tolerance defining a maximum tolerance window. Therefore, the server database only has to compare data sets within this maximum tolerance window. This processing performed by the server database is the second object data processing step for generating and updating a precision road property database. It may further be complemented by the following steps and methods.

The database preferably generates an object reference point for objects. Such object reference points may later be used for aligning objects or groups of objects. The object reference point preferably is assigned to a part or feature of an object, which may be identified easily and with comparatively high precision. It may for example be the geometric centre of a traffic sign or a specific light of a traffic light.

Preferably, the server database makes a statistical evaluation of the information received from the vehicles. If a significant number of vehicles report the same differences, there is a certain probability, that the real road has changed compared to the server database. Therefore, the server database may be updated.

A very important aspect is improving the object description accuracy of the third data sets when generating the fourth data sets. For example the object modelling in the third data sets as done by the vehicles might not be optimal for the fourth data sets and may be changed by the server database when the fourth data sets are generated. Also, GNSS position information is prone to errors, not all of which have a normal distribution, which could be dealt with by averaging. For example, a first number of third data sets originating from a first vehicle may have a certain position offset over a second number of third data sets originating from a second vehicle. Or, remaining errors in the third data sets, resulting from a lack of calibration and normalisation of the vehicle sensors, such as optical distortions, need to be dealt with. In order to improve the object description accuracy, the information, and especially the position information of a plurality of data sets, preferably third data sets, may be evaluated and/or aligned.

A preferred embodiment relates to a method of precision aligning of vehicle path data as follows to improve the collected data by matching and aligning certain collections of data related to the same part of the road. Preferably, the server database receives third data sets from a plurality of vehicles which are based on at least one ambient data set related to each of the sections of the vehicle path, which the vehicle decides to report. Such ambient data sets preferably relate to at least one of driving-relevant objects, road furniture and geographic objects. For generating such third data sets, object data processing is performed in the vehicle by evaluating the at least one ambient data sets and generating at least one second data set of driving-relevant object data based on the evaluation result and/or partial ambient data and/or intermediate processing results, and by comparing the at least one second data set of driving-relevant object data with at least one first data set of driving-relevant object data as stored in the vehicle database.

The server database identifies a first plurality of vehicle path sections related to a part of the road at least partially overlapping each other, each based on at least one third data set. There may be a preselection of such data sets based on location information about the data set, which may be a GNSS position information. This is followed by a first coarse alignment step of the third data sets in the first plurality of vehicle path sections relating to the same part of the road based on the location information contained in the at least one third data sets in each vehicle path section. For precision alignment, a plurality of object reference points and/or the related objects is identified in at least two vehicle path section. The reference points and/or the related objects are grouped such, that at least two vehicle path sections of the first plurality of the vehicle path sections comprise at least one of the same group of object reference points and/or the related objects. Finally, alignment functions for matching and/or aligning the at least one group of object reference points and/or the related objects in the at least two vehicle path sections of the first plurality of vehicle path sections relating to the same part of the road are generated or calculated. The same alignment functions are applied to at least a selection of the other third data sets of the same at least two vehicle path sections for generating or updating fourth data sets containing driving-relevant object data. Such alignment functions may comprise any of a linear translation and/or a rotation or even a more complex transformation.

It is further preferred that the server database uses fourth data sets from the server database together with the third data sets as a basis for alignment.

After generating and applying the alignment functions, the third data sets may be statistically processed by preferably calculating average values and/or standard deviations of the aligned third data sets.

It is also preferred to do additional alignment and/or alignment by using reference points at the road intersections and/or positions known from satellite images and/or fixed geographical reference points.

According to a further embodiment, a server database has the necessary means to perform the method of precision alignment of vehicle path data related to the same part of the road. Preferably, the method is performed by a computer having a computer program in memory.

The same method may be performed by a vehicle to improve accuracy of the second data sets, using the first and second data sets available in the vehicle. But it is preferred to perform the precision alignment of vehicle path data related to the same part of the road within the server database instead of the vehicle, as the server database has a significantly higher processing power and further has access to a large number of data provided by a large number of vehicles.

But even then, grouping may be performed by the vehicle for another purpose. Grouping of object reference points and/or the related objects may be beneficial for precise vehicle positioning. Along roads, there may be a significant number of objects with relative location references like centreline dashes. As there are many dashes which essentially look alike, it would be difficult to distinguish between the individual dashes and to get an absolute location reference longitudinally along the road. Anyway, even so, the dashes may be useful for determining the position of the vehicle orthogonally to the road, relative to the road borders. For verifying and correcting GNSS position information and/or for precise positioning of the vehicle relative to the objects of the road and also longitudinally along the road, further position references are required. Such position references may be unique objects or objects which rarely occur. Such references may be traffic signs or special marks on or besides the road. But special objects might not occur very often and not often enough for precise and continuous vehicle positioning. Therefore it is further preferred that a plurality of objects is grouped together. Even if the individual types of objects in the group may have many occurrences along the road and are not very distinguishable, such a group of objects, and especially the constellation it forms in 3D space may be unique for a long section of the road. An example is the constellation that two dashes form with the pole of a fence. Their position relative to each other has not been planned and therefore is very likely to be unique. Grouping of objects or object reference points allows to determine the vehicle's precise position on the road even if no really unique individual objects can be identified. The vehicle's precise position may be expressed as an offset to the position provided by a GNSS system. It may further be expressed by a position value within the position-world of the first data sets, meaning in relation to the driving-relevant objects and/or groups of driving-relevant objects as contained in the first data sets.

The following method describes a preferred embodiment of precise vehicle positioning. Preferably, the object reference points are identified within the first data sets. While driving, the vehicle generates second data sets from collected ambient data sets. In the second data sets, the vehicle tries to identify the same objects and/or object reference points and preferably groups of objects and/or object reference points as are contained in the first data sets. A vehicle's second data sets will usually only contain a selection of the data contained in the first data sets. By aligning the same objects or object reference points of preferably groups of objects and/or object reference points between the second data sets and the first data sets, the vehicle can derive a position value for its own position and this way position itself precisely on the road.

According to a further embodiment, the first, second, third and fourth data sets may have attached further information, for example a confidence level, providing information about the confidence or reliability of the information. If a high number of vehicles reported the same differences, the confidence level is high. If only one vehicle or a low number of vehicles reported the difference, the confidence level is low. The confidence level may also be dependent on the vehicle generated confidence level. Therefore, data sets with a higher vehicle generated confidence level may have a higher weighing factor. Another factor may be the sensor equipment grade of a vehicle. A better equipped vehicle may have a higher weight than a lower equipped vehicle when determining the confidence level. Generally, two different confidence level values like a high level and a low level may be sufficient. It may be desirable to have a higher number of confidence levels like three levels or nine levels which allow more detailed distinguishing. If a significant new information has been reported the first time by a vehicle, the confidence level may be low, but it may be an important or urgent information. The database manager therefore preferably generates at least a further tag, which may indicate the importance and/or urgency of an information. Alternatively, the confidence level may be set to a higher value to indicate a higher importance or urgency of the information. For example, a dynamically changed speed limit may be an urgent information, as a vehicle driving exceeding the limit would be subject to prosecution. Whereas a change in road marking may be less urgent, as the process of changing road markings takes hours or days, but it may also be an important information. Construction of a new building besides the road would neither be important nor urgent. But having information about the building may increase positioning accuracy. Generally, two different importance and/or urgency levels like a high level and a low level may be sufficient. It may be desirable to have a higher number of levels like three levels or nine levels which allow more detailed distinguishing.

If the server database knows that certain changes occur often at certain locations, for example there may be frequent speed changes at a certain location due to an electronic speed display, it may assign a higher confidence level. Furthermore, the vehicles preferably also provide a vehicle generated confidence level of difference information. The server database may further alter the confidence level based on knowledge about the vehicle or the environment, like the sensor quality, for example, if it is a low resolution or a high-resolution camera, and the data quality itself. In another example, a clear image with a high-resolution camera on a clear day would provide a higher confidence level than a low resolution image during a snowstorm.

Generally, data of further data providers like digital maps, satellite images or traffic information may be used to increase position precision of the data sets and/or to complement the data sets.

A further embodiment relates to a method which uses the first data sets to reduce the overall image processing load in a vehicle and to extend the usage range of highly automated driving (HAD) and other vehicle control applications, for example towards bad weather conditions.

Vehicle control applications such as HAD heavily rely on processing of image data from image sensors. Image processing requires a lot of processing power in a vehicle. Each type of image sensors typically has a limited usage range and its specific strengths and weaknesses. For example cameras provide high resolution images in colour but have a low dynamic range. They have difficulties with scenes with bright and dark areas. Cameras also don't work well in fog or rain. Radar, on the other hand, functions well under those conditions, but only provides low resolution monochrome images with reflectivity information. In order to compensate the weaknesses of the different types of sensors, various sensor types and multiple image sensors are combined in a vehicle to extend the usage range of HAD and other vehicle control applications. The need to evaluate and fuse the image data from multiple image sensors, results in a lot of processing power needed. Nonetheless, the usage range of HAD and other vehicle control applications is rather restricted because bad weather conditions still impose challenges despite expensive sensor equipment.

As described above, the method of generating and updating the precision road database adds additional image processing needs in the vehicle in order to process the ambient data sets, to generate second data sets, to compare second data sets with first data sets and to generate third data sets which are sent to the server database. Even more processing power is added for precision vehicle positioning by comparing the ambient data sets to the first data sets. At least the latter must always work in real-time at vehicle speed.

Preferably, this embodiment comprises two phases of processing and usage of data sets in vehicles. In a first phase, confidence in the fourth data sets is built up by the server database collecting third data sets of sections of the vehicles' paths and evaluating them to generate the fourth data sets which further serve as a basis for the first data sets. Already in this first phase the first data sets may be provided to vehicles by the server database and used by the vehicles in the generation of the second data sets for guiding the vehicle-side processing on the modelling approach of driving-relevant objects. But it is preferred if, in this first phase with lack of confidence in the object data, first data sets with low confidence level are not used by the vehicles for the processing of ambient data sets.

In a second phase, at least one of the first data sets generated from fourth data sets has reached a high confidence level because a sufficient number of third data sets have been collected by the server database in order to evaluate them and generate fourth data sets with precision results and with a high level of confidence. Out of the fourth data sets, the server database generates first data sets and sends them to the vehicles. First data sets with a high confidence level may be used for the processing of ambient data sets and for vehicle control applications. The type of use may be determined by the confidence level value. For example first data sets with a very high confidence level may be used for highly automated driving in fog while this function is de-activated if the confidence level of the respective first data sets is not very high. Driving in light rain, on the other hand, where the cameras 'see' more, may still be allowed if the confidence level in the first data sets is high but not very high. The limit value may be adapted to environmental and/or driving conditions.

In the following, the first phase and the second phase are explained in detail.

Preferably, in the first phase of building up confidence, the processing load on a vehicle is limited by sampling ambient data sets for a segment of the road and by processing the resulting sequence of ambient data sets off-line, meaning not following the vehicle at its speed by leaving segments of the road out between segments of the road that are processed. This restriction is not a disadvantage for the collection of third data sets by the server database. The collection of third data sets can rely on many vehicles providing third data sets for segments of their path. It is not necessary that one vehicle provides complete information about its complete path. Each vehicle can sample and store a sequence of ambient data sets and process it off-line with as much processing power as it has and take as long as it needs for that. If that vehicle misses parts of its path in between segments of its path that it processes, these gaps will be filled by other vehicles.

The method of generating second data sets and/or information for vehicle control and/or information for vehicle positioning and/or storing of sequences of ambient data sets and off-line processing has various options, which mostly have been described before but are summarized below. Any one or a plurality of these options may be selected to complement off-line processing:

Zoom option: Selecting an ambient data set, which has been taken close to an object to be processed and shows it large and clear for good recognition results. More distant ambient data sets may be used for step-wise triangulation and positioning of the object relative to other objects. This results in good recognition and precise positioning results with lean processing algorithms.

Close-up option: Selecting an ambient data set which is close to the object of interest, in each ambient data set. As only the near-field is of interest, where recognition and relative measurements work well and/or lean processing algorithms can be used.

Moving back and forth option: Moving back and forth through the ambient data sets in order to determine objects of interest from a close distance or from different viewing angles and distances and thus with lower processing power.

Sequence option: Running a sequence of ambient data sets in series through different sets of algorithms. It is not necessary to process and recognise all objects in parallel as real-time processing would require. This increases the possibilities for applied overall processing while reducing the requirement on processing power significantly.

Review option: Processing backwards from the latest ambient data set into the past. In contrast to real-time processing, as for example the HAD control application does, there is no need to look forward from the latest ambient data set into its far-field and thus into the future of what will be coming towards the vehicle. Also this results in lean algorithms and low processing power needed.

Overall, the fact that off-line processing of sequences of ambient data sets is possible in this first phase, results in good processing results with lean algorithms and a low burden on the processing power needed.

It is also preferred if the generation of third data sets in this first phase mainly is done if the processing conditions are good, meaning at good weather and in good light conditions. Not having to generate third data sets under bad conditions, leads to being able to mainly rely on cameras only as image sensors for the ambient data sets and low processing power needed, even for good processing results. Because processing of ambient data sets can be done under good conditions and no real-time processing is needed in this first phase, the available processing power can be used for generation of third data sets with many driving-relevant objects, fully populated data and precision results as is needed in this first phase for good third data sets for segments of the vehicles' paths.

In the second phase, at least one of the first data sets generated from fourth data sets has reached a high confidence level. There may still be further first data sets having a low confidence level. First data sets with a high confidence level just need to be probed and confirmed by vehicles passing the respective objects. It is preferred if vehicles actively confirm the data in the first data sets within the third data sets until a very high confidence level has been reached. It is preferred if the vehicles mainly report their path driven only within third data sets, once the data in the first data sets has reached a very high confidence level. By reporting their path driven without reporting a difference, the vehicles indirectly confirm the data of the first data sets along the path. This reduces communication volume. It is also preferred if the path driven information of a vehicle is neutralized such that it cannot be tracked down to the driver and raise privacy concerns. It is preferred if the server database monitors how many vehicles and when have directly or indirectly confirmed which parts of data in first data sets. If there have not been enough confirmations, it is preferred for the server database to change the confidence level of the respective data in the fourth data sets to a respectively lower value.

If a vehicle could only confirm parts of first data sets along its path actively or indirectly or report differences, the server database would need to track, which vehicle confirmed which part of data of first data sets. For this, the server database would need to know more specifically, which vehicle moved on which path at what time. This may cause privacy concerns. In order to avoid that, each vehicle preferably is able to confirm all first data sets along its path or to detect differences. This requirement means real-time processing of all ambient data sets, at least to a certain extent.

In order to realize that with low burden on the processing power, it is preferred that, from a high confidence level on, first data sets are used to support the processing of ambient data sets. This support may be provided for the generation of driving-relevant objects for the second data sets and it may be provided by two fundamentally different methods:

Method 1: As described before, the first data sets comprise object descriptions of the driving-relevant objects of the empty road. It can be used to quickly detect and check for the same objects in the ambient data sets. However, for this, the ambient data sets have to be processed at least up to a certain object level first, before such comparison is possible. If, for example, a stop sign is partly covered with snow, it is most likely not possible to recognize it as an object for comparison with the object data of the first data sets.

Method 2: As described before, the first data sets, preferably, comprise a vector graphics format, which allows rendering as an image in different ways and from different viewing angles. For each of the images in an ambient data set, a respective image of the empty road or parts thereof can be rendered, which shows the view of the empty road and of the driving-relevant objects in the expected places and in the way a respective sensor 'sees' the empty road. This allows comparison already on image level. For example to compare an image from a camera sensor, a respective image can be rendered from the first data sets in the way, also humans see and from the viewing angle of the respective camera. For an image from a radar sensor, a respective image can be rendered from the first data sets in the way, a radar sensor sees the world, with reflectivity and run-time information. Comparing ambient data sets already on an image level to first data sets, allows to reach the right conclusions faster and with a higher level of certainty and/or with lower processing power. The partly snow-covered stop sign can now be recognized by comparing the ambient data sets already on an image level to images of the empty road under good conditions and by identifying the shape of the stop sign in the right place and maybe some blob of red colour, where a part of the sign is not covered by snow. Method 2 helps object recognition in a similar way as humans do image processing by using images generated from the first data sets as a kind of experience ground-truth for comparison.

Method 1 and method 2 may also be used in a mixed form. For example, first, the object description of the empty road in the first data sets may be checked for the driving-relevant objects to be detected, before a comparison on image level takes place for detailed and fast detection. The processing may also jump back and forth between object description and image representation of the empty road to iterate towards good processing results.

In this way, the first data sets may be used to support the generation of the second data sets. This lowers the necessary processing power and allows the processing to follow the vehicle at speed, without gaps, in order to confirm the complete content of the first data sets along the vehicle's path to the server database or to report differences between first and second data sets in third data sets. The task of ambient data set processing moves from segment processing in the first phase to at least partial real-time processing in the second phase.

In addition to the update of the server database in third data sets, first data sets may also be used to support the evaluation of the ambient data sets and comparison to the first data sets for precision vehicle positioning, which also is a real-time task. Objects and/or object reference points and/or groups of objects and/or groups of object reference points can be identified and compared quickly and/or with lower processing power that without the help of the first data sets.

In the same way, the first data sets can also support the real-time processing of ambient data sets done by the HAD function or other vehicle control applications. This reduces the necessary processing power in order to do HAD, precise vehicle positioning and update of the precision road database in parallel.

The support of image processing by the first data sets, especially through method 2, also increases the usage range of HAD and other vehicle control applications towards bad weather conditions. Methods 1 and 2 for support of ambient data processing through the first data sets can also be used for the vehicle control applications. The example of the partly snow-covered stop-sign was discussed before. Another example is automated driving at night time. The cameras only 'see' as far as the headlights shine. Radar may see further, but is not able to 'see' the road markings. First data sets can help to 'see' the road markings further ahead of the vehicle by providing an expectation where they will be or go as soon as the camera starts to identify them at the edge of its range of vision. These were only a few examples of a broad variety of possibilities how first data sets help HAD and other vehicle control applications.

It is obvious that the sequence of some of these steps may be changed, assumed that any of the previous steps has provided data required in a later step.

The embodiments described above relate to a method for generating and updating a precision road property database comprising driving-relevant objects by using a vehicle, a server database handling, processing, storing data sets comprising driving-relevant road object data, and communicating with a vehicle, as well as a vehicle having means for collecting driving-relevant data, evaluating such data and communicating with the server database. Preferably, the method is performed by a computer or a plurality of computers having a computer program in memory.

DESCRIPTION OF DRAWINGS

In the following, the invention will be described by way of example, without limitation of the general inventive concept, on examples of embodiment with reference to the drawings.

FIG. 8 shows an example of grouping of objects.

In FIG. 1, a general scenario with self-driving vehicles driving on roads is shown. A road network 100 comprises a plurality of roads 101. The roads have specific properties like the width, the direction, the curvature, the number of lanes in each direction, the width of lanes, or the surface structure. There may be further specific details like a curb stone, a centreline, even a single dash of a dashed centreline or other markings like a crosswalk. Close to the roads are driving-relevant geographic objects 140. A geographic object may be any stationary object like but not limited to a building, a tree, a river, a lake or a mountain. Furthermore, there is plurality of road furniture objects 150 which may comprise objects and pieces of equipment installed on streets and roads for various purposes, such as benches, traffic barriers, bollards, post boxes, phone boxes, streetlamps, traffic lights, traffic signs, bus stops, tram stops, taxi stands, public sculptures, and waste receptacles. There may be further objects which are not falling into one of the above categories, but are also relevant for driving. Such objects may be green-belts, trees, stones, walls or other obstacles close to a road. They may also comprise structures like trenches, plane surfaces and others which may be considered for planning alternate, emergency exit or collision avoidance paths.

Figure 1:
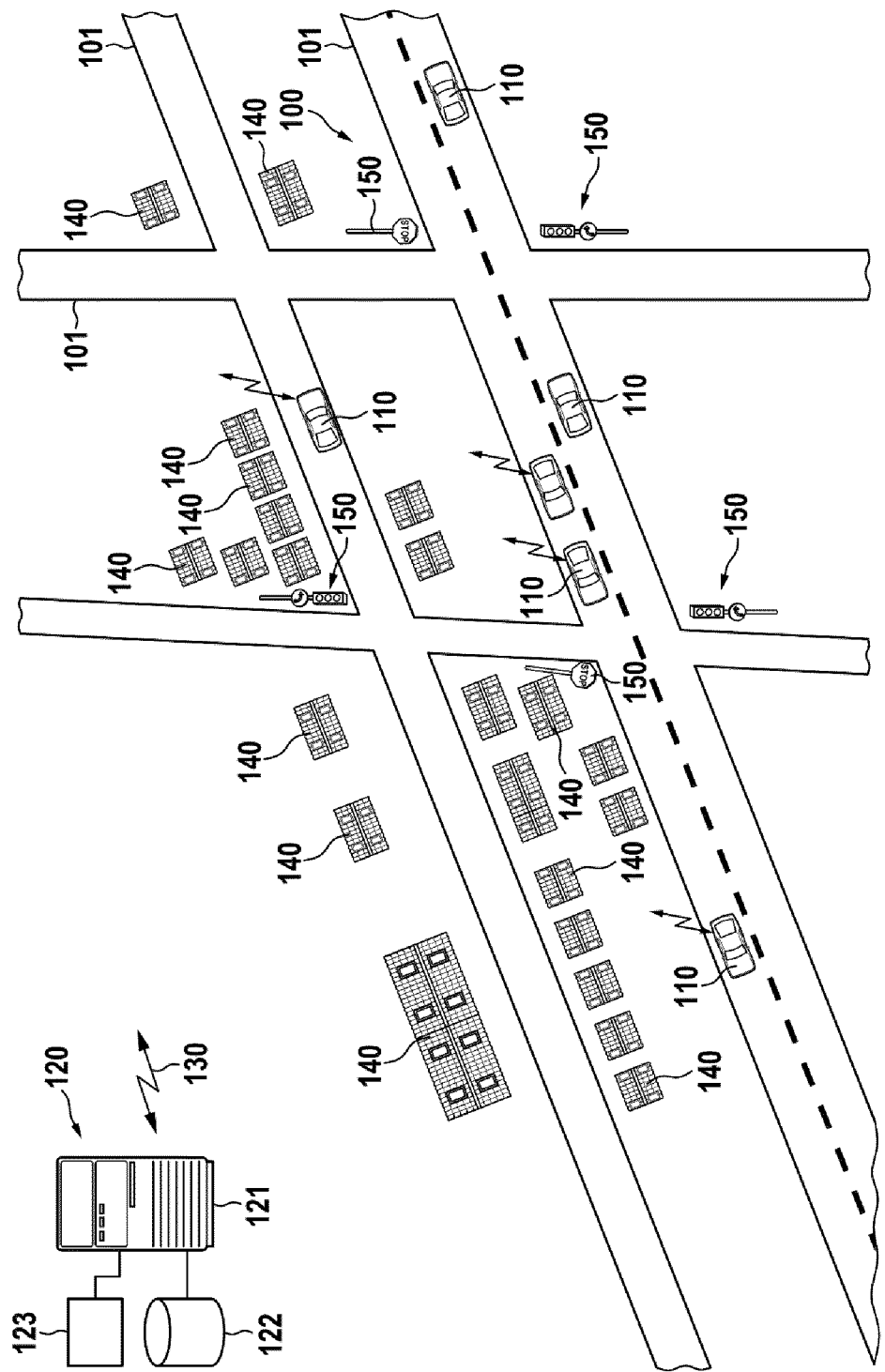
FIG. 1 shows a general scenario with self-driving vehicles driving on roads.

Furthermore a service provider 120 preferably has at least a database hub 121 connected to a server database 122. For the communication between the service provider 120 and the vehicles 110, a communication network 130 is provided. Such a communication network may be a mobile communications network, Wi-Fi or any other type of network. Preferably, this network is based on an Internet protocol. The embodiments generally relate to vehicles, which may be cars, trucks, motorbikes or any other means for traveling on a road. For simplicity in the figures cars are shown.

Figure 2:
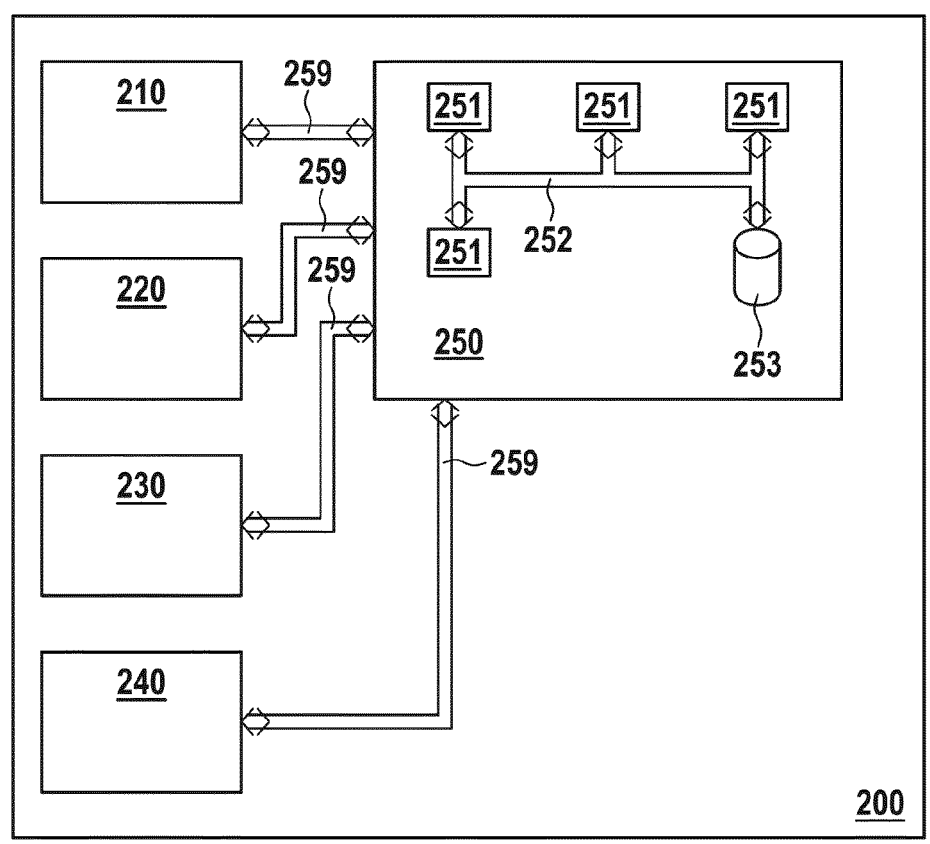
FIG. 2 shows basic vehicle components.

In FIG. 2, basic vehicle components 200 are shown. Preferably a vehicle comprises at least one of environmental sensors 210, vehicle status sensors 220, position sensors 230 and a communication system 240. These are preferably connected by at least one communication bus 259 to a processor system 250. This communication bus may comprise a single bus or a plurality of buses. The processor system 250 may comprise a plurality of individual processors 251 which preferably are connected to each other by a bus 252. Furthermore they are preferably connected to a vehicle database or storage 253.

Environmental sensors 210 collect information about the environment of the vehicle. They may comprise a camera system like a CCD camera which may be suitable for capturing visible and/or infrared images. Preferably a simple mono-camera is provided. Alternatively, a stereo camera, which may have two imaging sensors mounted distant from each other may be used. There may be further sensors like at least one radar sensor or at least one laser sensor or at least one RF channel sensor or at least one infrared sensor or another environmental sensor. The sensors may be used for scanning and detecting outside objects.

The status sensors 220 collect information about the vehicle and its internal states. Such sensors may detect the status of driving, driving speed and steering direction.

The position sensors 230 collect information about the vehicle's position. Such position sensors preferably comprise a GNSS system. Any positioning system like GPS, GLONASS or Galileo may be used. Herein only the term GPS or GNSS is used indicating any positioning system. There may further be a Gyro, a yaw sensor and/or an accelerometer for determining movements of the vehicle. It is further preferred to have a wheel dependent distance sensor like a rotation sensor which may be used for further systems like antilocking systems or Anti Blocking System (ABS) for measuring driven distances and/or a steering sensor for detecting driving direction. There may be further sensors like an altimeter or other altitude or slope sensors for precision detection of altitude changes. The position sensors 230 may at least partially interact with or use signals from the status sensors 220.

The communication system 240 is used for communication with devices outside of the vehicle. Preferably, the communication system is based on a communication network, which may be a mobile communications network, Wi-Fi or any other type of network. The communication system may use different communication networks and/or communication protocols dependent on their availability. For example in a parking position of the vehicle Wi-Fi may be available. Therefore in such positions Wi-Fi may be the preferred communication network. Furthermore, Wi-Fi may be made available at intersections, close to traffic lights and close to road sections with low traffic speeds or regular congestion. If Wi-Fi is not available, any other communication network like a mobile communications network may be used for communication. Furthermore, the communication system 240 may have a buffer to delay communication until a suitable network is available. For example, road property data which has been allocated during driving may be forwarded to a service provider, when the vehicle has arrived in a parking position and Wi-Fi is available.

The processor system 250 may be a processor system which is already available in a large number of vehicles. In modern vehicles, many processors are used for controlling different tasks like engine management, driving control, automated driver assistance, navigation, and entertainment. Generally, there is significant processor power already available. Such already available processors or additional processors may be used for performing the tasks described herein. The processors preferably are connected by a bus system which may comprise a plurality of different buses like CAN, MOST, Ethernet or FlexRay.

Figure 3:
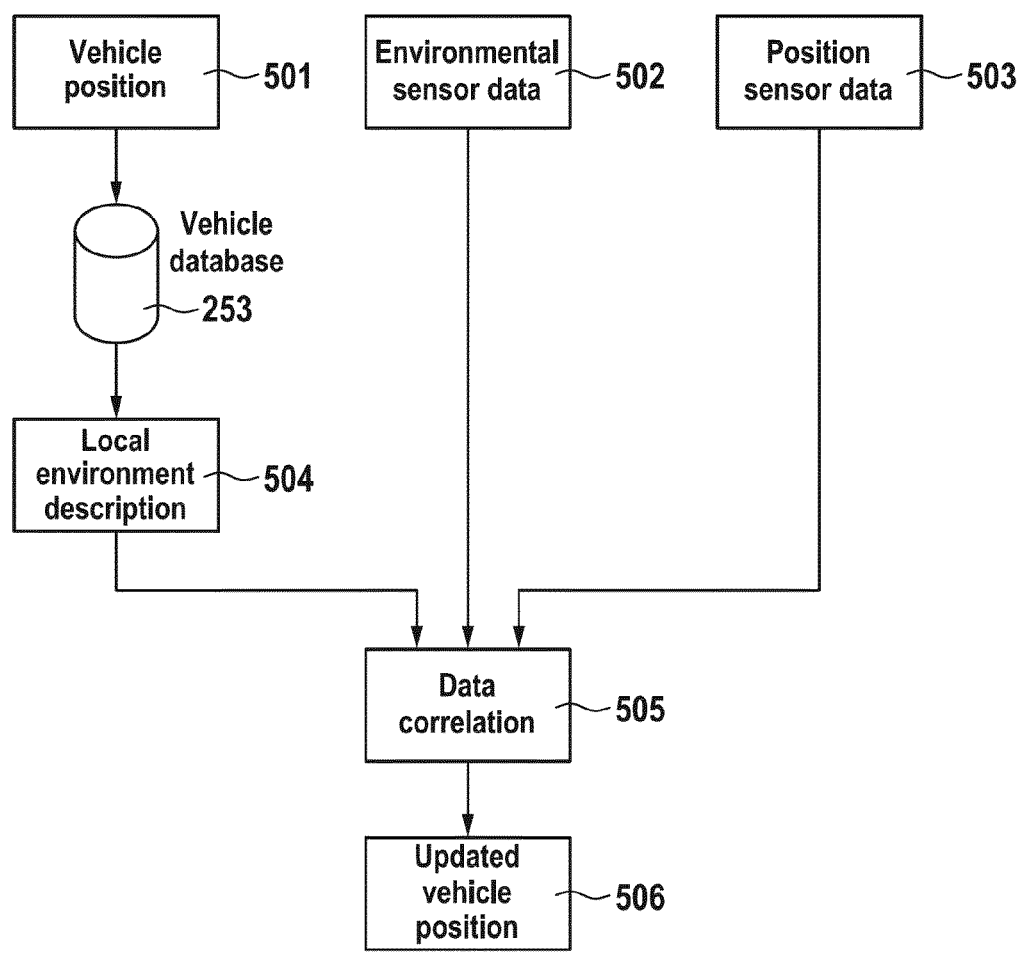
FIG. 3 shows a precision vehicle position detection.

In FIG. 3, the basic data flow of precision vehicle position detection is shown. The position accuracy which may be achieved by positioning systems like GNSS is not sufficient for self-driving vehicles. A standard position tolerance of 10 m is more than the width of normal roads. To enable self-driving it is necessary to achieve a much more precise determination of a vehicle position.

As a starting point preferably the best estimate of the vehicle's position 501 is used. This may for example be a GNSS determined position. It may also be the last known position of the vehicle. This information is forwarded to a vehicle database 253 which contains a local environment description 504. This local environment description may contain data about the road, like but not limited to the road furniture and/or the geographic environment. This data is correlated 505 preferably in a data correlator unit with environmental sensor data 502 which may have been acquired by environmental sensors 210. Further preferably, position sensor data 503 which may have been acquired by the vehicle position sensors 230 may be used for further correlation. By at least correlating the local environment description 504 with environmental sensor data 502 an updated vehicle position information 506 may be obtained.

Figure 4:
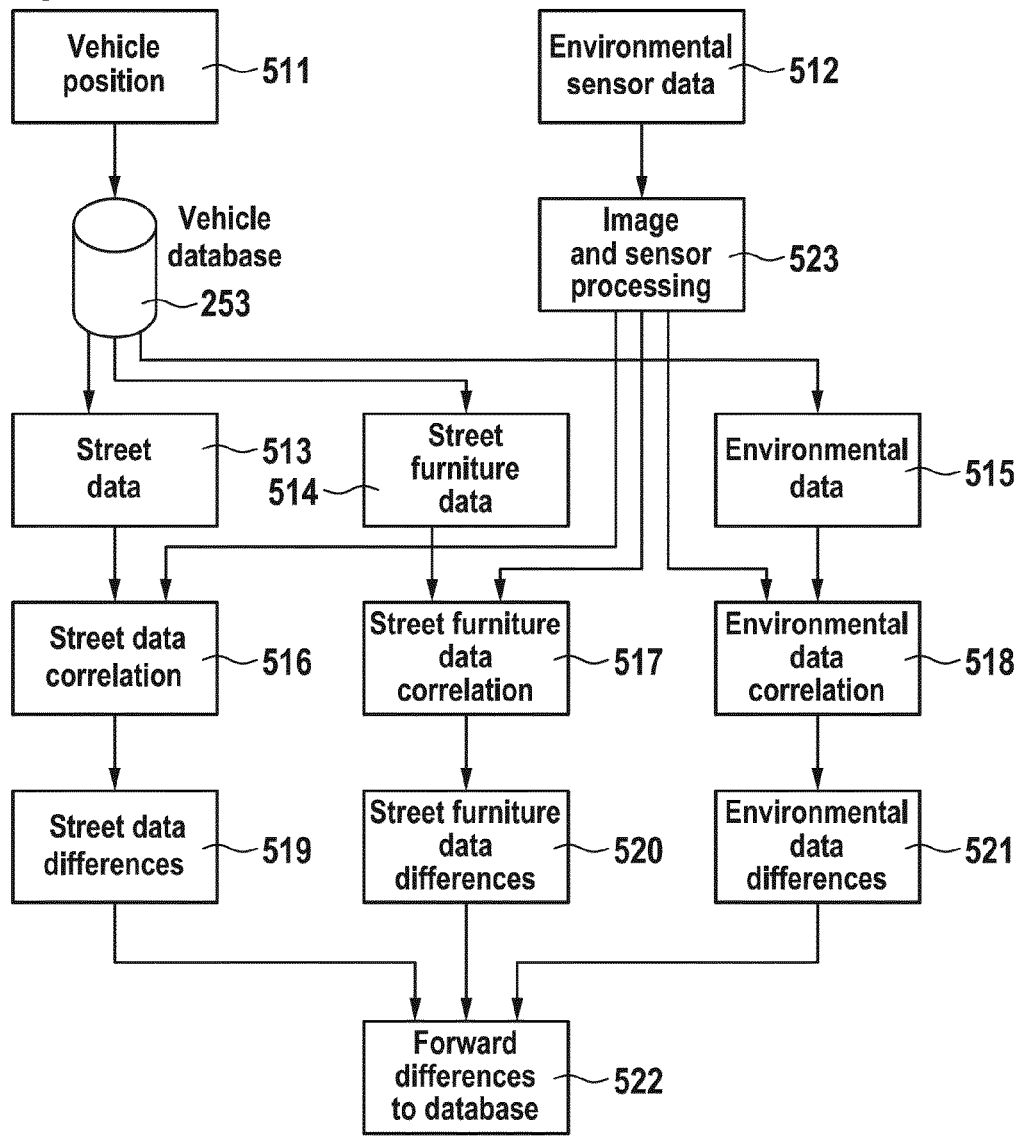
FIG. 4 shows road property data updating.

In FIG. 4, the data flow of road property data difference detection is shown. Again, as a starting point preferably the best estimate of the vehicle's position 501 may be used. This may for example be a GNSS determined position. It may also be the last known position of the vehicle or an updated vehicle position from step 506. This information is forwarded to a vehicle database 253 which preferably delivers at least road property data 513, road furniture data 514 and environmental data 515. Furthermore, environmental sensor data 512 may be acquired by environmental sensors 210.

Preferably, the environmental sensor data passes a specific data processing or image processing 523 to generate data required for the data correlation steps. Road property data correlation 516 using road property data 513 of the vehicle database and environmental sensor data 512 preferably generates data containing road property data differences 519. Road furniture data correlation 517 using road furniture data 514 of the vehicle database and environmental sensor data 512 preferably generates data containing road furniture data differences 520. Furthermore, environmental data correlation 518 using environmental data 515 of the vehicle database and environmental sensor data 512 preferably generates data containing environmental data differences 521. The generated difference data may contain more or less information depending on the amount of differences detected. For the case, no differences have been detected, the differences may contain no further information or only a marker indicating that that no further information is available. For the case, the vehicle database 253 did not deliver any specific data like roads data 513, road furniture data 514 or environmental data 515, the differences may contain a full data set as provided by the environmental sensor data 512. Alternatively, the environmental sensor data is further compressed by a data compressor or compression procedure in a computer. Upon request by the server database, the vehicle may provide full data sets or even additional data like images or partial images.

Figure 5:
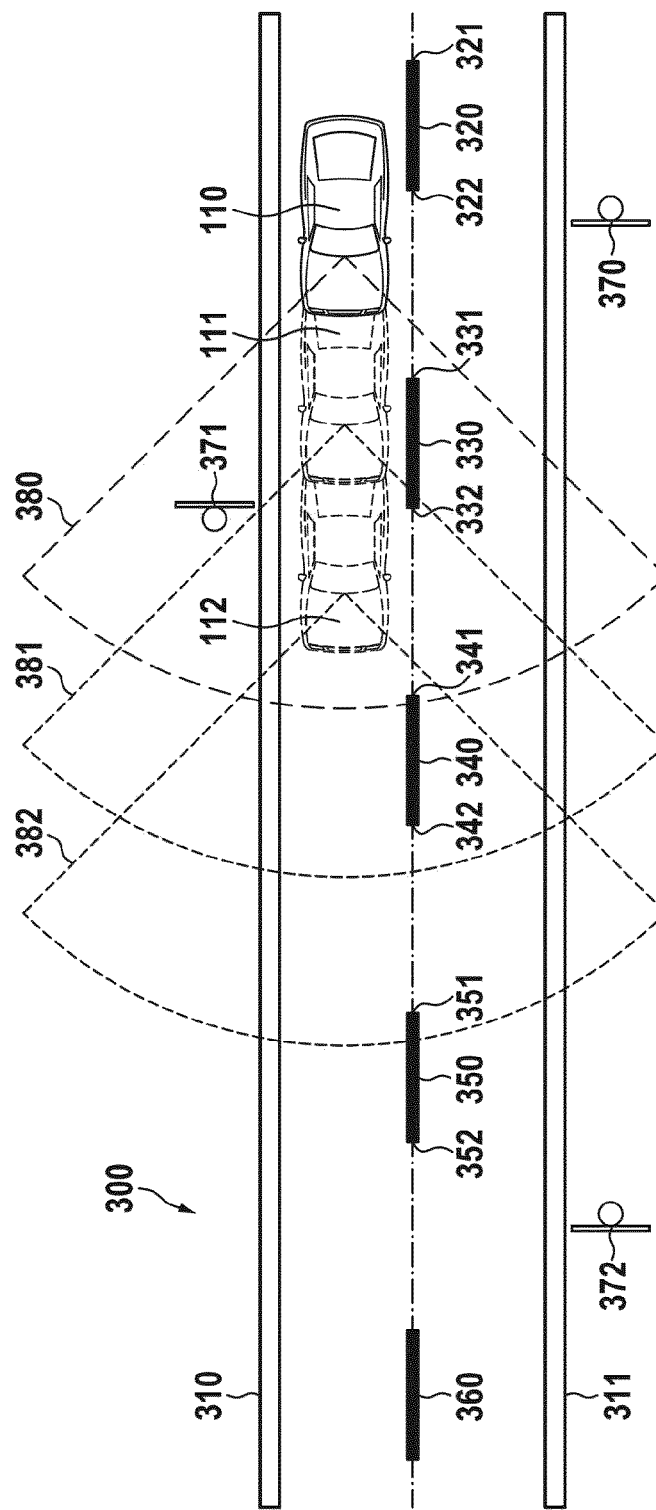
FIG. 5 shows basic ambient data set acquisition.
Figure 6A:
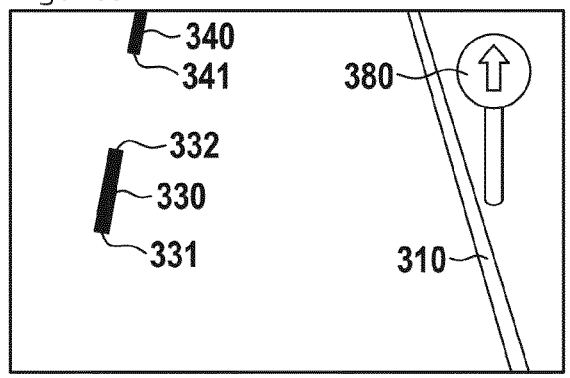
FIGS. 6a, 6b and 6c show different images taken by a vehicle proceeding along a road.
Figure 6B:
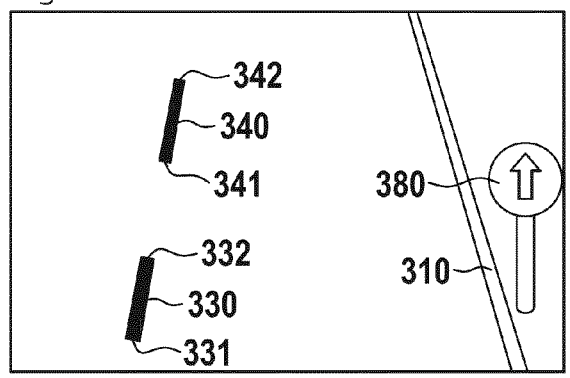
Figure 6C:
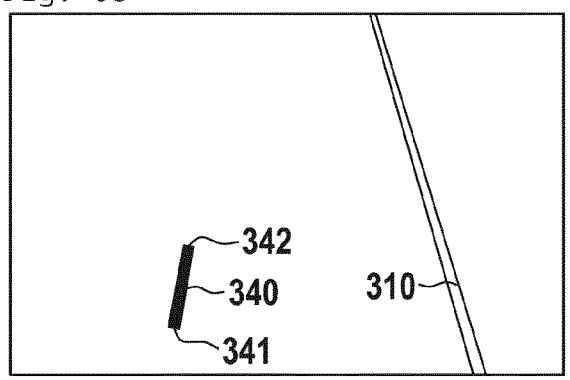

In FIG. 5 basic acquisition of an ambient data set and generation/evaluation of road objects is shown in more detail together with FIGS. 6a, 6b and 6c. Generally, the term ambient data set is used herein for a data set generated by a plurality of sensors which may comprise at least one optical image sensor and/or radar sensor and/or infrared sensor and/or other environmental sensor. From the combination and/or correlation of these sensor signals, an ambient data set from the perspective of a vehicle is collected, out of which a set of road objects is generated. A vehicle 110 is driving on a road 300. The road has the right limit 310 and the left limit 311 which may be marked by limit lines, a curb or any other limitation or marking means. At the centre of the road there is a centreline which is a dashed line in this embodiment, having a plurality of dashes 320, 330, 340, 350 and 360. Each dash has a beginning and an end. The beginnings are marked 321, 331, 341, and 351 whereas the ends are marked 322, 332, 342 and 352. There may be any other type of centreline or even no centreline. Furthermore, there is some road furniture, which may be traffic signs 370, 371, 372. From the captured ambient data set the vehicle preferably identifies the above mentioned road objects and most preferably generates respective second data sets.

Although an ambient data set may give a 360 degree representation of the vehicle's environment, here a more limited view is shown by referring to a viewing sector 380 which may correspond to a front camera, having an approximately 90° viewing angle. The corresponding front image is shown in FIG. 6a. Here only part of the road objects, the right limit 310 and the traffic sign 380 can be seen at the right side of the image. The left side of the image shows centreline dash 330 and part of the following centreline dash 340. It is obvious, that this view gives a clear image of the road objects related to the right lane of the road, where the vehicle is driving, but cannot provide too much information about the road objects at the left lane from which parts can be seen in the left top corner of the image. When the vehicle proceeds along the road through positions 111 and 112, it captures images according to the image sectors 381 and 382. The corresponding images together with the identified road objects are shown in FIGS. 6b and 6c.

Figure 7:
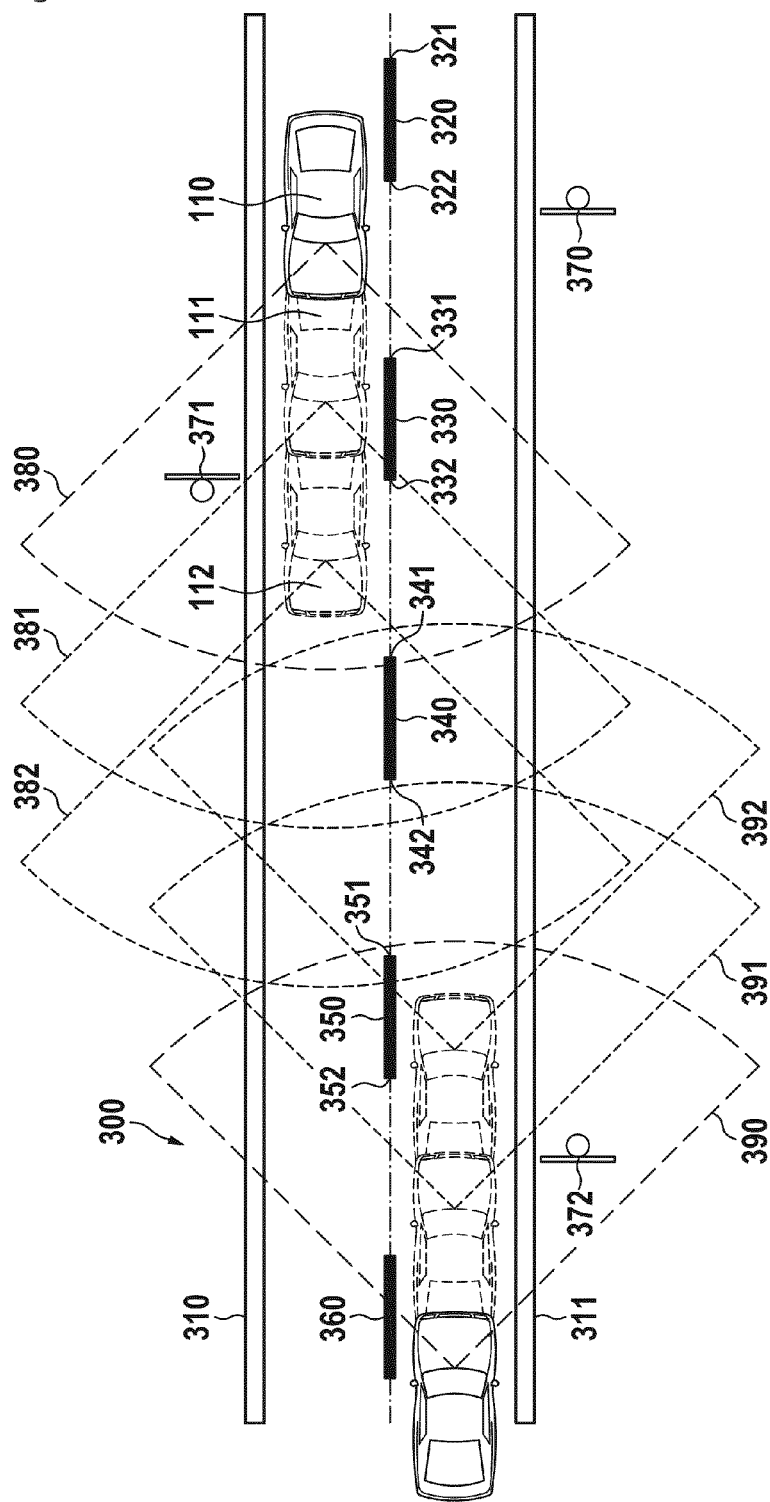
FIG. 7 shows a full ambient data set acquisition.

Matching this sequence of road objects will give a continuous representation of the road. This matching cannot be compared to image stitching which is known from panorama cameras or panorama software. There, only matching marks in adjacent images have to be identified and the images must be scaled accordingly. For matching of road objects a spatial transformation of the driving-relevant object data sets must be done. Such a transformation may be a linear displacement, a scaling or even a complex nonlinear transformation to align captured data. Details of such transformation will be explained later. These transformations will be partially facilitated by the road objects themselves, which may allow automatic recalibration of sensors when consistent errors are found between detected road objects in second data sets and first data sets. In FIG. 7, an acquisition and evaluation of a driving-relevant object data set for a full road is shown. As explained with respect to FIG. 5, a first set of ambient data 380, 381 and 382 is captured by a first vehicle propagating in a first direction on the right lane which is from the right to the left on the top lane in this figure, and converted to driving-relevant object data sets. A second set of ambient data is captured by a second vehicle propagating in the opposite direction on the left lane which is from the left to the right on the bottom lane in this figure, and converted to driving-relevant object data sets. The driving-relevant object data sets generated by the second vehicle may be similar as shown in FIGS. 6a, 6b and 6c. The main difference is that the driving-relevant object data sets now mainly contain the road objects at the second lane and therefore provide information about the second lane. So far, none of the vehicles has a full set of the road objects of the full road, but the server database may fit together the information provided by the vehicles to get the full set of all road objects provided so far. For this purpose, the vehicles generate object-based information about the individual road objects like right limit 310, left limit 311, centreline dashes 320, 330, 340, 350, 360 and traffic signs 370, 371, 372. This object-based information is collected and evaluated by the server database to generate a full driving-relevant object data set of the road in the second object data processing step of the two-step processing for generating and updating a precision road property database. This example is not limited to two vehicles, but may be extended to any number of vehicles. It is further not required that a single vehicle provides a continuous stream of driving-relevant object data sets. For example, the object-based information relating to the first ambient data set as shown in FIG. 6a may be provided by a first vehicle, whereas the object-based information relating to the second ambient data set of FIG. 6b may be provided by a second vehicle, passing the same road at a later time, and the third ambient data set of FIG. 6c may be captured by a third vehicle, again passing the same road later.

In FIG. 8 an example of grouping of objects is shown. Grouping of objects may be used to provide a simplified and better matching of adjacent ambient data sets by the vehicle or of driving-relevant object data sets by the vehicle or by the server database. Basically, a vehicle may use grouping for the first object data processing step. Most preferably, the server database uses grouping for the second object data processing step.

Along roads, there may be a significant number of relative location references like centreline dashes. As there are many dashes which essentially look alike, it would be difficult to distinguish between the individual dashes and to get an absolute location reference. Anyway, the dashes may be useful for determining the position of the vehicle relative to the road. For verifying and correcting GNSS position information, further absolute position references are required. Such position references may be objects which rarely occur or which at least occur only once within a GNSS tolerance interval. Such references may be traffic signs, gullies, manholes or just characteristic markings on the road. They may be grouped together with road markings like dashed centrelines. A first group 401 comprises centreline dash 350 and traffic sign 372. A second group 402 comprises the centreline dash 330 and the traffic sign 370 as well as the traffic sign 371 at the opposite side of the road. By referencing to such groups of objects, it is possible to calculate the correct transformation of driving-relevant object data sets or further sensor data having the group or at least parts thereof. Such a transformation may be a linear displacement, a scaling or even a complex nonlinear transformation to match a captured driving-relevant object data set. This allows a better matching of driving-relevant object data sets being taken of the road, even if there are errors in the three-dimensional conversion of the taken images or measured parameters from which the driving-relevant object data sets of a vehicle have been generated. Consequently, the precision of the generated object models is improved. For example, if a driving-relevant object data sets is available of the second vehicle showing group 401, the traffic sign 372 would only be at the outmost corner of the corresponding driving-relevant object data set of the vehicle driving in the opposite direction, but the corresponding centreline dash may also be well identified by the vehicle driving in the opposite direction. This is further shown in more detail in the next figures.

Figure 9A:
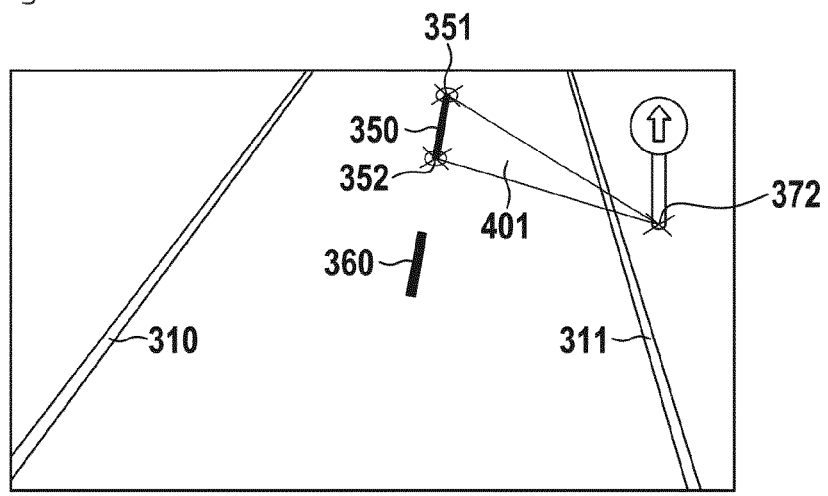
FIGS. 9a and 9b show a first example of matching by grouping objects.
Figure 9B:
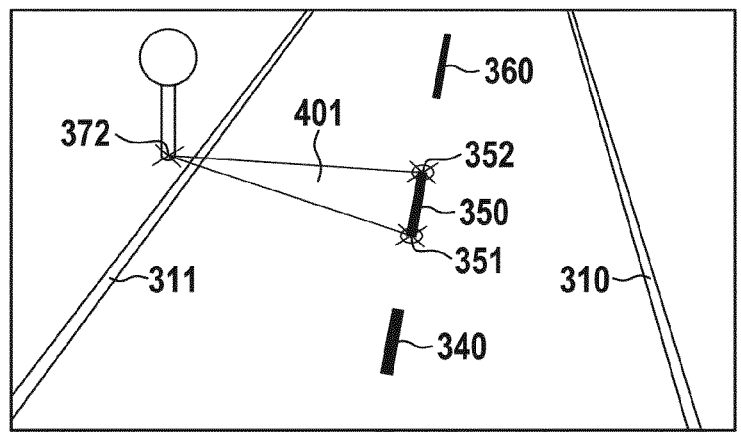

In FIGS. 9a and 9b a first example of matching by grouping objects is shown. FIG. 9a shows the view from a vehicle at the bottom lane of FIG. 5 passing from the left to the right. Here, the traffic sign 372 is well visible and can easily be grouped together with centreline dash 350 to form a first group of objects 401. As the traffic sign is in the main field of view, its position can be determined precisely. Furthermore, the relative position of centreline dash 350 can also be determined precisely. FIG. 9b shows the view from a vehicle on the top lane passing from the right to the left. Traffic sign 372 is only at the outmost corner of the image and far away. By aligning the grouped objects and/or by aligning the pattern formed by the grouped objects like the triangle, an easy matching of driving-relevant object data sets taken by different vehicles driving in different directions can be achieved. Object grouping and matching may be improved by determining characteristic points and/or edges of the objects. In this embodiment, the first end 351 and the second end 352 of the centreline dash 350 are used together with the base of traffic sign 372 to generate a characteristic pattern of the first group of objects 401. Matching of this pattern allows precise fitting of individual driving-relevant object data set pieces and/or object positions together to generate a precise total object description. As in FIG. 9a and FIG. 9b basically the same triangular pattern is identified, the two driving-relevant object data sets and/or object positions may easily be matched together, although they have been made from different views.

Furthermore, this matching may be used for precision position determination. The vehicle driving from right to left in FIG. 5 cannot use traffic sign 372 as it is in the outmost periphery of its view. By identifying the centreline dash 350 of the first group of objects 401 a comparatively precise location can be done. Based on the information determined by a vehicle previously driving from left to right, the vehicle driving in the opposite direction knows the precise location of centreline dash 350 which is associated with traffic sign 372.

Figure 10A:
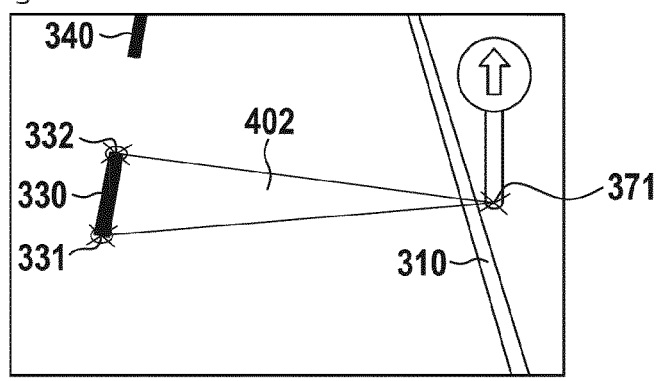
FIGS. 10a and 10b show a second example of matching by grouping objects.
Figure 10B:
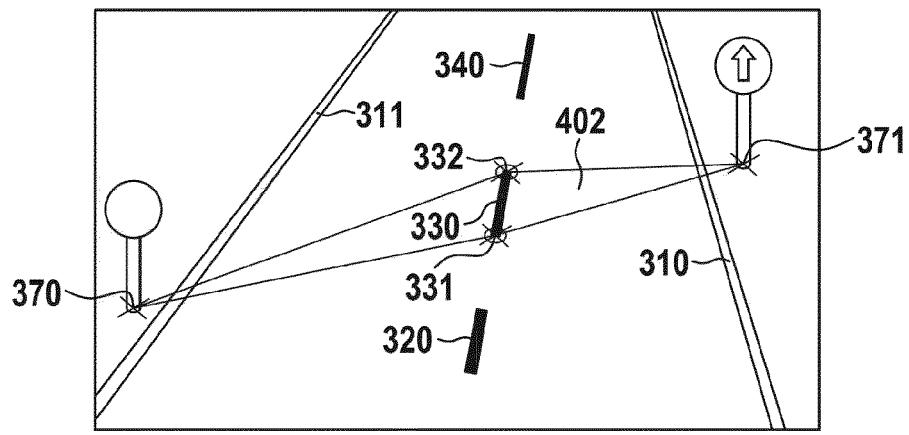

FIGS. 10a and 10b show a second example of matching by grouping objects. Here, a second group 402 of objects, comprising the centreline dash 330 and the traffic sign 371 is shown. The contour of this group is defined by the first end 331 and the second end 332 of the centreline dash 330 together with the base of traffic sign 370 and the base of traffic sign 371. In FIG. 10a a first driving-relevant object data set generated by a vehicle driving the road of FIG. 5 from right to left on the top lane is shown. Here, only part of the group 402 is shown. In FIG. 10b, a different driving-relevant object data set taken by a different vehicle and/or by a different camera is shown. This driving-relevant object data set has been captured with image sensors with a larger viewing angle and therefore also shows traffic sign 370. Here, all the members of the second group 402 of objects are shown. At least the first section of group 402 comprising centreline dash 330 and traffic sign 371 can be correlated with the previous driving-relevant object data set. By referring to the traffic sign 371 at the other side of the road further alignment with objects detected by a vehicle driving in the opposite direction may be made.

Figure 11:
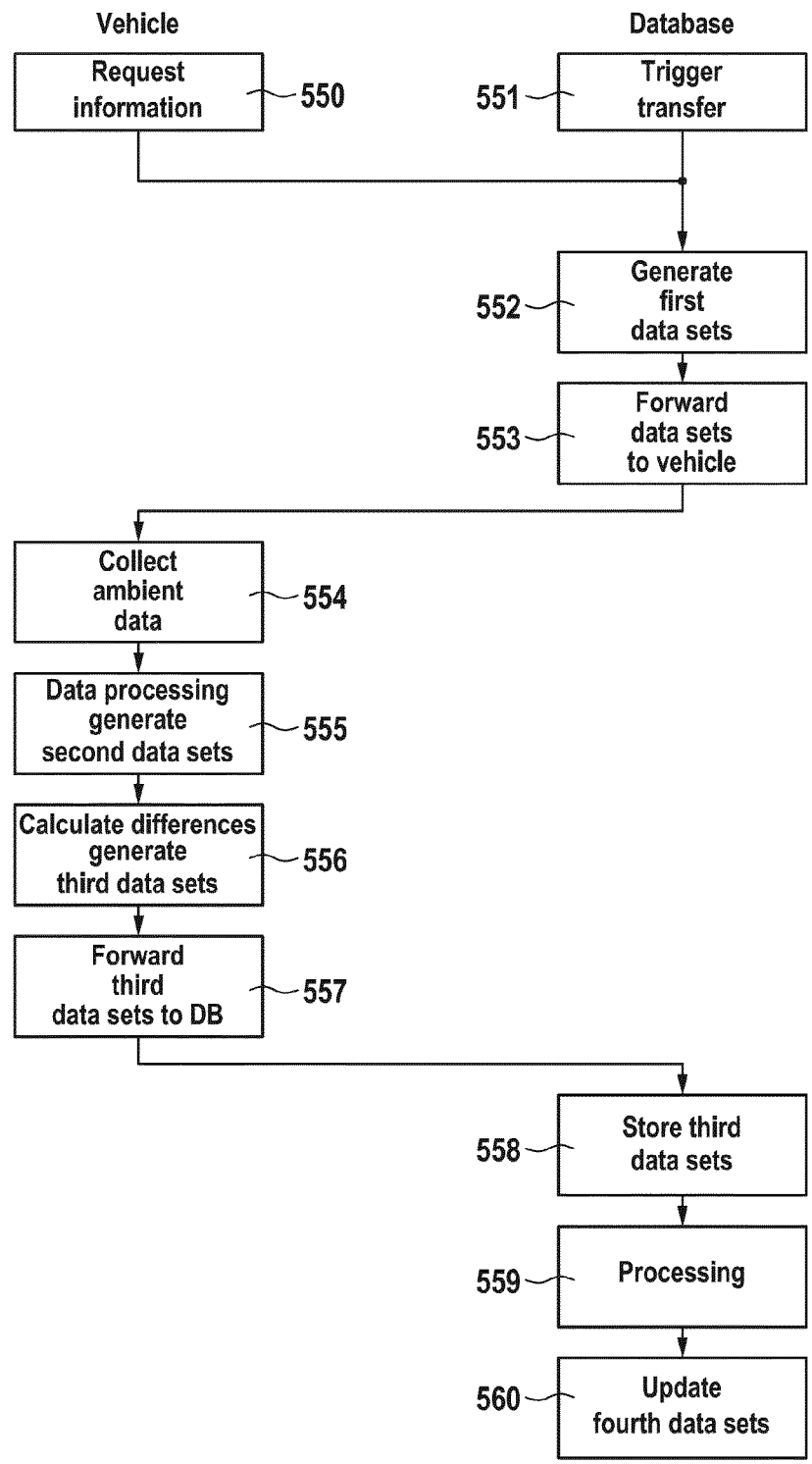
FIG. 11 shows the basic flow of data collection.

In FIG. 11 the basic flow of data collection, distribution and processing is shown. Specifically the combination of the first object data processing step 555 in the vehicle and the second object data processing step 559 in the server database result in data sets having a high accuracy and precise position information. According to the method, a precision road property database comprising driving-relevant objects is updated by using a vehicle which is communicating with the server database. The figure has two columns. The left column shows the actions related to the vehicle, while the right column shows actions related to the server database. The server database preferably stores driving-relevant object data. Such driving-relevant object data may further comprise at least location information and detailed object-based information about at least one of a road object, a road furniture object, a geographic object and a further object related to driving.

In a first step, the vehicle requests information 550 from the server database, for example based on a planned route or an area of interest. Alternatively, the server database may trigger a transfer 551, for example for updating specific information. After such a request or trigger, the server database generates 552 at least one first data set which is related to the request or trigger. These first data sets are based on fourth data sets stored in the server database. Preferably, each first data set comprises driving-relevant object data. Preferably, the server database has stored information about the status of the vehicle database. Such information may comprise a copy of the data sets stored in the vehicle or at least one identifier for identifying data sets stored in the vehicle. This status information is preferably updated after the vehicle has confirmed reception of first data sets. By using this status information, the first data set may only comprise amended data sets and/or new data sets. There may be data sets which the vehicle does not have, data sets, which the vehicle has, but which are updated, data sets, which the vehicle has, but which are retransmitted, or data sets which the vehicle should delete. Therefore, if requested by the vehicle, the at least one first data set may contain data about the required coverage. If triggered by the server database, the at least one first data set may contain updated data and/or warning data and/or data which should be verified by the vehicle. Preferably, each first data set comprises at least one location information and detailed object-based information. The location information specifies a position, an area or region to which the detailed object based information is applicable.

In a next step, the first data sets are forwarded to the vehicle 553 and stored in the vehicle database. Following, the vehicle collects ambient data 554 by at least one sensor as described above. This collection may take place along at least a specific section of its path and/or at a specific time and/or a specific object. Preferably, the ambient data sets are relating to at least one of driving-relevant objects, road furniture and geographic objects. Such ambient data is processed in the first object data processing step 555 to generate second data sets comprising object-based information. This processing may include statistical evaluation based on the ambient data and/or at least one of the first data sets. It may further include grouping, matching and transformation of data as described above. In a further step 556, the differences between the third and first data sets are preferably calculated to generate third data sets containing differences between the object-based information of the second data sets and the object-based information of the first data sets related to the section of the vehicle path. Furthermore, at least one third data set may comprise object-based information of at least one second data set instead of a difference to a first data set. If necessary and/or requested by the server database, such third data sets may also contain new data and/or data independently of existing first data sets. In a next step 557, the third data sets are forwarded to the server database. The server database stores the received third data sets 558 and starts processing them in the second object data processing step 559. Such processing preferably comprises statistical evaluation and further post processing of the third data sets. Additionally, the fourth data sets stored in the server database may be used. Such post processing may include object grouping, object matching, group matching, transformation, statistical calculations, and other processes. Later, the fourth data sets may be updated 560 by using the results thereof.

Figure 12:
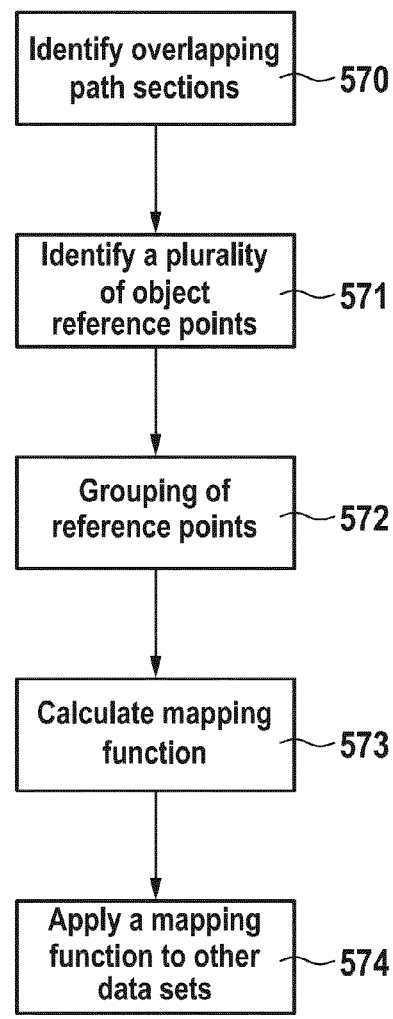
FIG. 12 shows a detailed flow diagram of precision alignment of vehicle path data related to the same part of the road by the vehicle

In FIG. 12 a detailed flow diagram of precision alignment of vehicle path data related to the same part of the road as part of step 555 by the vehicle is shown. In step 570 the vehicle identifies a first plurality of vehicle path sections relating to the same part of the road and at least partially overlapping each other based on at least one second data set. Then, in step 571, a plurality of object reference points is identified in each vehicle path section. A reference point preferably is a point which can easily and precisely be identified. The reference points are grouped in step 572 such, that in at least two of the vehicle path sections of the first plurality of vehicle path sections, each group comprises the same object reference points. Later, alignment functions for matching and/or aligning the at least one group of object reference points in at least two of the vehicle path sections of the first plurality of vehicle path sections relating to the same part of the road are generated or calculated in step 573. Such an alignment function may comprise any of a linear translation and/or a rotation or even a more complex transformation. The same alignment functions are applied in step 574 to all other second data sets of the same at least two vehicle path sections for generating or updating fourth data sets containing driving-relevant object data.

After generating the alignment functions, the second data sets may be statistically processed by preferably calculating average values and/or standard deviations of the third or second data sets.

Figure 13:
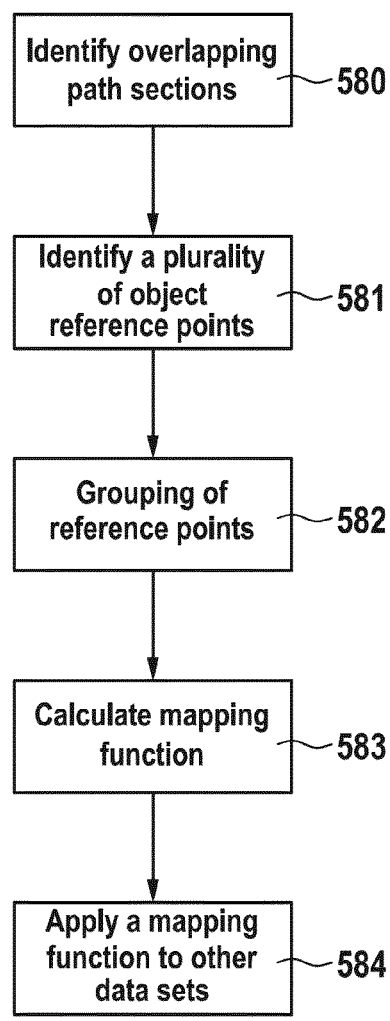
FIG. 13 shows a detailed flow diagram of precision alignment of vehicle path data related to the same part of the road by the server database.

In FIG. 13 a detailed flow diagram of precision alignment of vehicle path data related to the same part of the road by the server database as part of step 559 is shown. In step 580 the server database identifies a first plurality of vehicle path sections relating to the same part of the road and at least partially overlapping each other based on at least one third data set. Then, in step 581, a plurality of object reference points is identified in each vehicle path section. A reference point preferably is a point which can easily and precisely be identified. The reference points are grouped in step 582 such, that in at least two of the vehicle path sections of the first plurality of vehicle path sections, each group comprises the same object reference points. Later, alignment functions for matching and/or aligning the at least one group of object reference points in at least two of the vehicle path sections of the first plurality of vehicle path sections relating to the same part of the road are generated or calculated in step 583. Such an alignment function may comprise any of a linear translation and/or a rotation or even a more complex transformation. The same alignment functions are applied in step 584 to all other third data sets of the same at least two vehicle path sections for generating or updating fourth data sets containing driving-relevant object data.

After generating the alignment functions, the third data sets may be statistically processed by preferably calculating average values and/or standard deviations of the fourth or third data sets.

Figure 14:
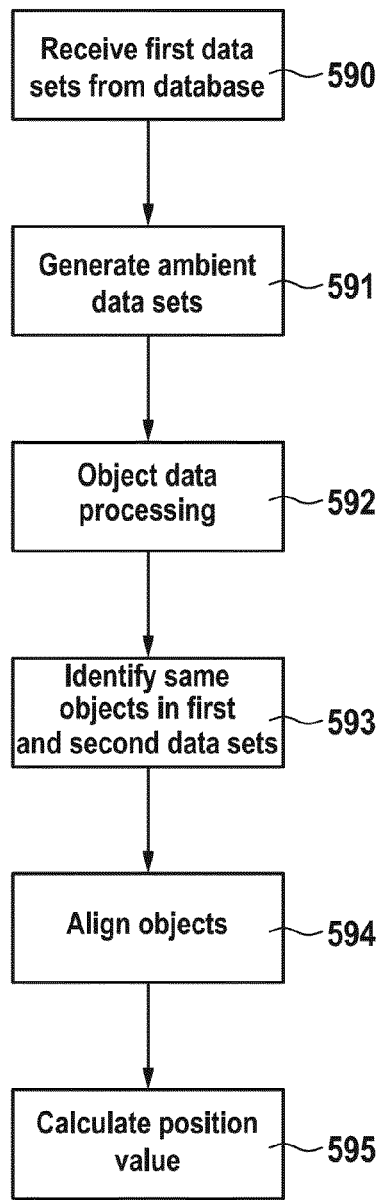
FIG. 14 shows a detailed flow diagram of precision positioning.

In FIG. 14, a detailed flow diagram of precision positioning is shown. Precision positioning of a vehicle is done by using data from a database and data collected by the vehicle when traveling along a path. In a first step 590, the vehicle receives first data sets from the database, which are based on fourth data sets comprising driving-relevant object data. Such driving-relevant object data may comprise at least location information, an optional object reference point and detailed object-based information about at least one driving-relevant object like a road object, a road furniture object, a geographic object or a further object related to driving. When driving, in step 591, the vehicle generates a plurality of ambient data sets along at least sections of its path by at least one sensor of the vehicle. The ambient data sets relate to at least one of driving-relevant objects, road furniture and geographic objects. In step 592, the vehicle performs object data processing by evaluating the at least one ambient data sets and generates at least one second data set of driving-relevant object data based on the evaluation results. In step 593, during driving and after generating second data sets, the vehicle tries to identify in the second data sets the same driving-relevant objects and/or object reference points and/or groups of driving-relevant objects and/or object reference points as are contained in the first data sets. In step 594, the vehicle aligns the same driving-relevant objects and/or object reference points and/or groups of driving-relevant objects and/or object reference points between the second data sets and the first data sets, and calculates or derives a position value for its own position in step 595.

Figure 15:
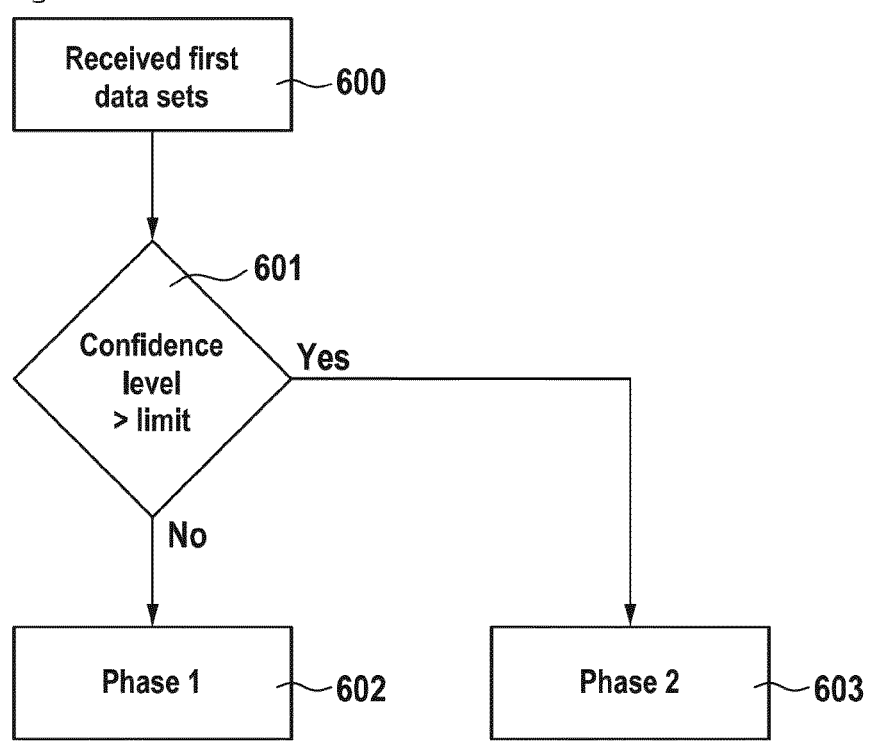
FIG. 15 shows the basic 2-Phase method of building up a road database.

FIG. 15 shows the basic 2-Phase method of building up a road database while reducing the overall image processing load in a vehicle and extending the usage range of highly automated driving (HAD) and other vehicle control applications. After step 553 of FIG. 11, a vehicle has received first data sets in step 600. In the comparison step 601, the confidence level of individual first data sets is compared with a limit value. If the confidence level exceeds the limit value, the second phase, phase 2 is initiated for the first data set. Else phase 1 starts with said first data set.

Figure 16:
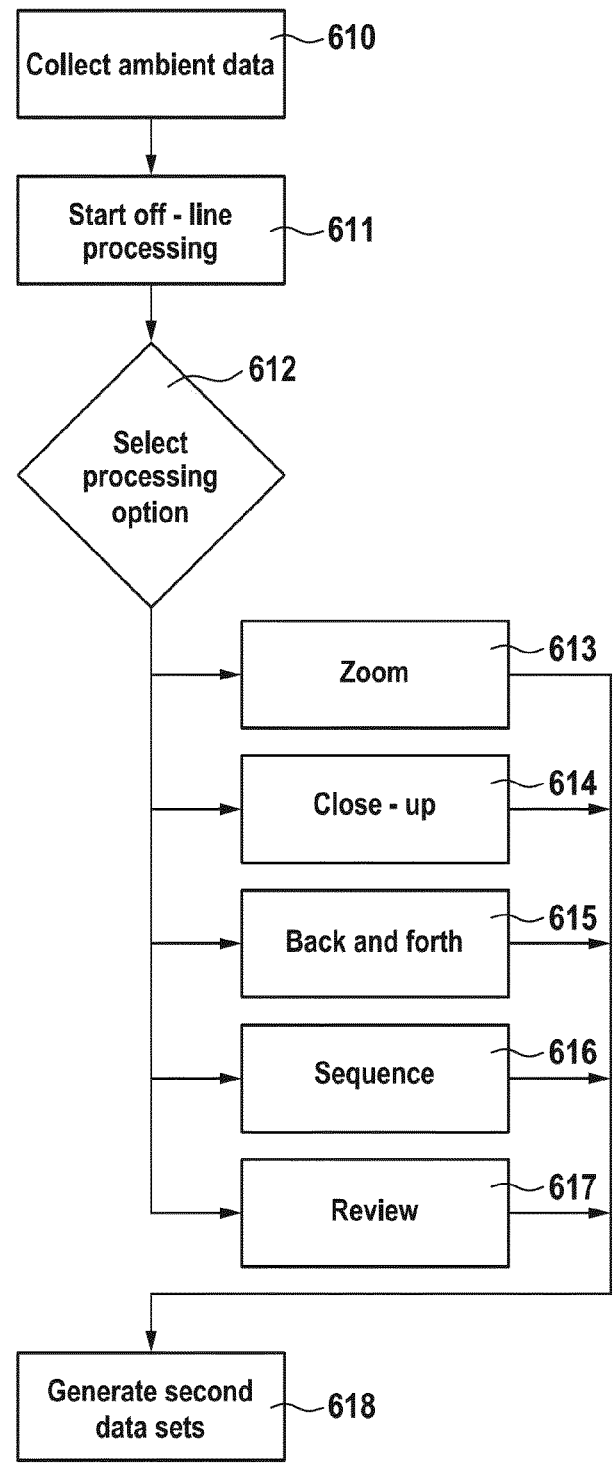
FIG. 16 shows phase 1 in detail.

FIG. 16 shows Phase 1 in more detail. Here, further ambient data is collected in step 610 as may be shown in more detail in FIG. 4. Later, off-line data processing is started in step 611, using the ambient data. Although it is preferred, to process the collected ambient data off-line, e.g. after driving or when driving on a road segment where no data is sampled for further processing, processing may be done on-line if sufficient processing power is available. In step 612 a processing option is selected. Such processing options have been disclosed in more detail above and may comprise:

Zoom 613: Selecting an ambient data set, which has been taken close to an object together with more distant ambient data sets for step-wise triangulation and positioning of the object relative to other objects. This results in good recognition and precise positioning results with lean processing algorithms.

Close-up 614: Selecting an ambient data set which is close to the object of interest, in each ambient data set.

Moving back and forth 615: Moving back and forth through the ambient data sets in order to determine objects of interest from a close distance or from different viewing angles and distances.

Sequence 616: Running a sequence of ambient data sets in series through different sets of algorithms.

Review 617: Processing backwards from the latest ambient data set into the past.

After selecting one or a plurality of these options, third data sets are generated in step 618.

Figure 17:
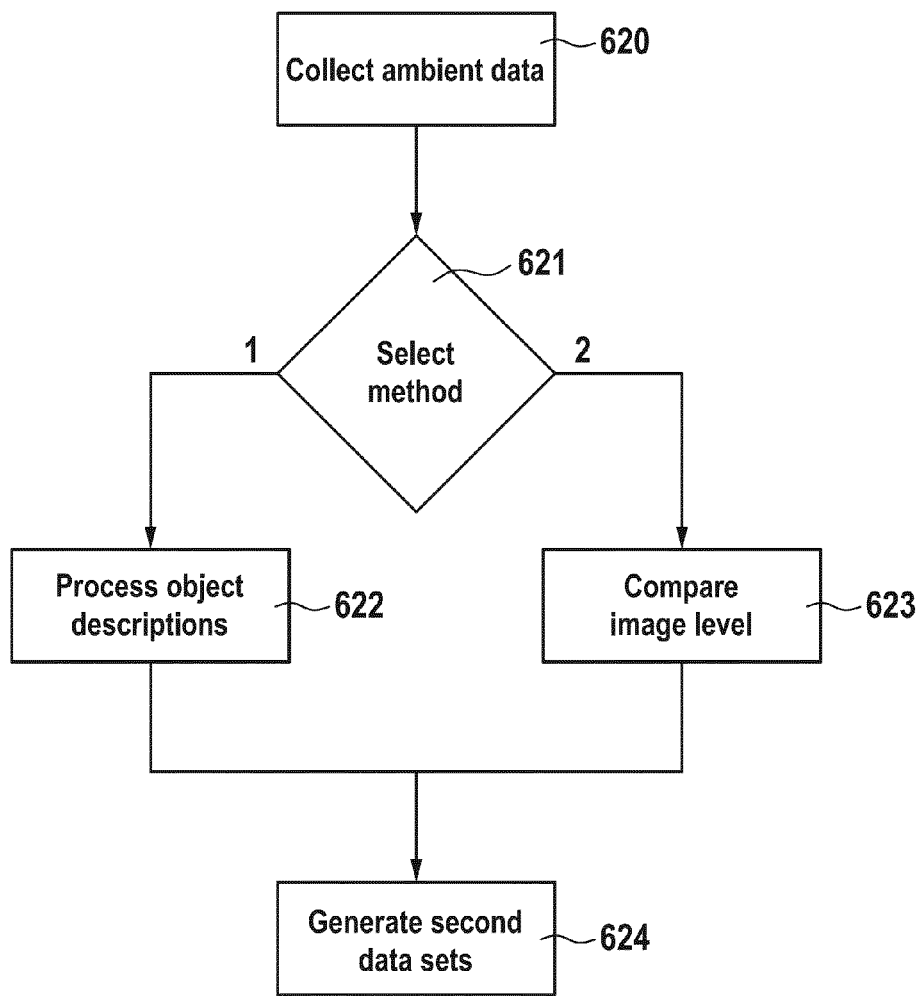
FIG. 17 shows phase 2 in detail.

FIG. 17 shows Phase 2 in more detail. First, ambient data are collected in step 620. In step 621 the method of generation of driving-relevant objects for the second data sets is selected. Steps 620 and 621 may be exchanged in their order. So either the method may be selected on the kind of ambient data or other parameters or the data may be collected as required by the method. The decision on the method is mainly based on the type of first data sets. If the first data sets comprise object descriptions of the driving-relevant objects of the empty road, the first method is selected. If the first data sets comprise a vector graphics format, which allows rendering as an image in different ways and from different viewing angles, the second method is selected.

If method 1 has been selected, the object descriptions of the first data sets are processed. If method 2 has been selected, a comparison on image level is made. Details of this method are disclosed above. By using either method, second data sets are generated 624 based on first data sets. Furthermore, both methods may be used for the same data sets.

In addition to the steps shown here, the first data sets may be probed and confirmed by the vehicle. Differences may be reported via third data sets.

The selection of the method may be made starting to collect ambient data. In such a case the selector 621 is not required.

Figure 18:
FIG. 18 shows an image of an exemplary road.

FIG. 18 shows an image of an exemplary road having a plurality of driving relevant objects.

Figure 19:
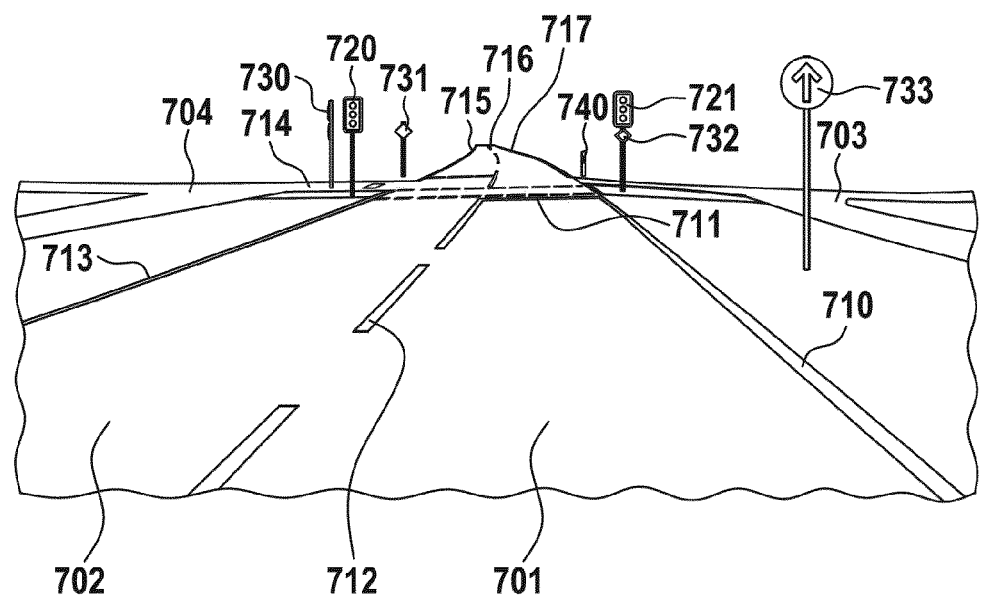
FIG. 19 shows the driving relevant objects of FIG. 18.

FIG. 19 shows the driving relevant object in the previous image. There are roads 701-704, street markings 710-717, traffic lights 720 and 721 and traffic signs 730-733. First data sets, which may be stored in a vehicle preferably comprise driving-relevant object data. Such driving-relevant object data may further comprise at least location information, an optional object reference point and detailed object-based information about at least one driving-relevant object like a road object, a road furniture object, a geographic object or a further object related to driving and data comprising a vector graphics format, which allows rendering as an image. A first data set may further comprise confidence level information.

Figure 20:
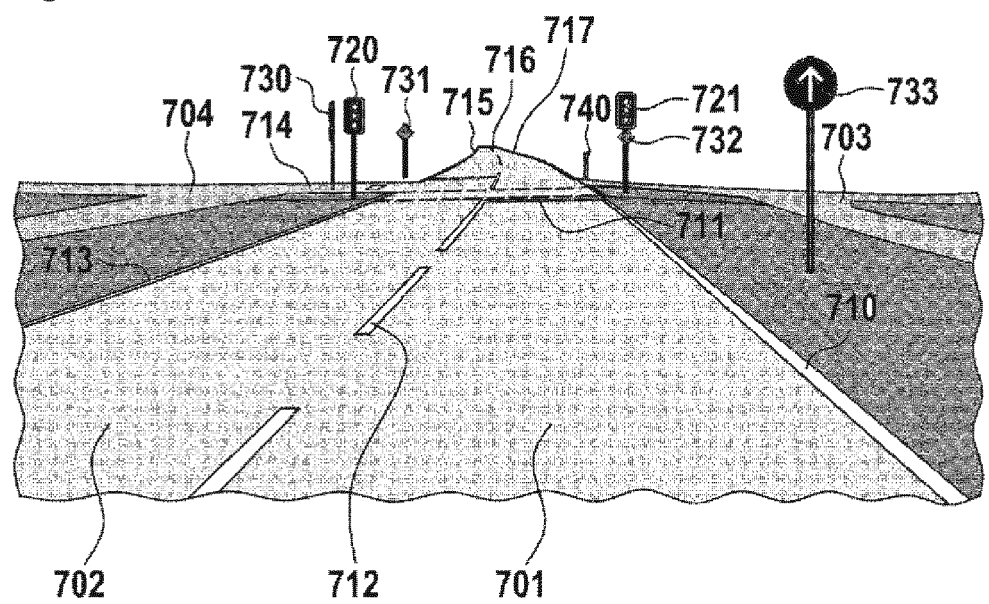
FIG. 20 shows an image rendered from objects.

FIG. 20 shows an image rendered from objects related to driving and data comprising a vector graphics format of the first data sets preferably relating to the objects of the previous figure. Such rendered images may be used for generating information for vehicle control and/or information for vehicle positioning and/or second data sets for generating and updating first data sets by comparing the at least one ambient data set on an image level to an image or partial image. The ambient data sets may have been previously collected along its path by at least one sensor of the vehicle, the ambient data sets preferably relate to at least one of driving-relevant objects, road furniture and geographic objects. Alternatively, the information may be generated by comparing the at least one ambient data set with the object descriptions of the at least one first data set comprising object descriptions of the driving-relevant objects of the empty road.

The invention claimed is:

1. A method for generating and updating a precision road property database that includes information about driving-relevant objects, the method comprising:
   a) with a computer of a server database, operably connected with a tangible storage of the server database that contains pre-stored data sets with driving-relevant object data including location information and object-based information about at least one of said driving-relevant objects including at least one of a road object, a road furniture object, and a geographical object,
      generating first data sets from said pre-stored data sets, each first data set comprising said driving-relevant object data;
   b) either with a computer of a vehicle, requesting information about a location from the computer of the server database to have the computer of the server database transfer the first data sets containing the driving-relevant object data concerning the location to the computer of the vehicle,
      or
      with the computer of the server database, initiating a data transfer to the computer of said vehicle and forwarding said first data sets containing the driving-relevant object data concerning the location to the computer of the vehicle;
   c) with the computer of the vehicle, storing the first data sets in a vehicle database;
   d) based at least on said location information contained in the first data sets or transferred to the computer of the vehicle separately, collecting ambient data sets at the vehicle with the use of at least one vehicular sensor under at least one of the following conditions:
      (d1) along path sections, of a vehicle path that includes said location; and
      (d2) at a specific time or time interval; and
      (d3) about a driving-relevant object,
      said ambient data sets characterizing said at least one of the driving-relevant objects,
   e) with the computer of the vehicle,
      acquiring said ambient data sets from the at least one sensor of the vehicle,
      evaluating the ambient data sets to form an evaluation result, and
      generating second data sets based on the evaluation result, each second data set comprising driving-relevant object data, f) with the computer of the vehicle, generating third data sets that contains at least one of:
    (f1) differences between the object-based information of the second data sets and the object-based information of the respectively corresponding first data sets related to the path sections, and
    (f2) the object-based information of the second data sets related to the path sections,
g) with the computer of the vehicle, forwarding the third data sets to the computer of the server database via a communication network,
h) with the computer of the server database, identifying a plurality of said path sections that at least partially overlap with one another and storing a selection of the third data sets corresponding to said plurality of said path sections,
i) for each of said path sections from said plurality, with the use of the computer of the server database:
    (i1) grouping together related objects identified in such path sections that at least partially overlap each other to generate at least one group of objects, and
    (i2) performing at least one of:
        matching location information of said at least one group of objects with location information of groups of objects comprising the same related objects of other data sets from said selection, and
        matching the path sections from said plurality by aligning the groups of objects between the path sections,
j) with the computer of the server database, performing at least statistical evaluation and post processing of j1) the third data sets from said selection of the third data sets corresponding to the plurality of the path sections that at least partially overlap with one another and j2) corresponding pre-stored data sets, and
k) with the computer of the server database, modifying the pre-stored data sets in the tangible storage of the server database based on results of said performing.

2. The method according to claim 1, wherein said generating second data sets based on the evaluation result includes generating at least partial object data of at least parts of the driving-relevant objects based on said acquiring the ambient data sets from the at least one sensor of the vehicle.

3. The method according to claim 1, wherein said modifying the pre-stored data sets in the tangible storage of the server database includes forming modified pre-stored data sets representing a consolidated model of the road network that provides driving relevant information.

4. The method according to claim 1, wherein grouping together related objects identified in such path sections to generate at least one group of objects includes generating said at least one group of objects that includes a road object and at least one of a road furniture object and a geographic object.

5. The method according to claim 1, comprising:
    with the computer of the server database:
        having initiated data transfer to the computer of the vehicle and forwarded said first data sets to the computer of the vehicle, transferring to the computer of the vehicle a sampling request specifying time at which said collecting of the ambient data sets with the use of at least one vehicular sensor should be carried out.

6. The method according to claim 1, wherein the at least one of the first data sets and the third data sets includes auxiliary data that contain a statistical parameter, wherein said statistical parameter defines at least one of an average value and a standard deviation characterizing object data in a respective data set.

7. The method according to claim 6, wherein said generating third data sets, with the computer of the vehicle, includes selecting at least one specific path section based said auxiliary data such that the at least one specific path section that has been selected is characterized by at least one of a low confidence level, a large standard deviation, and no data available in the corresponding auxiliary data.

8. The method according to claim 6, comprising: with the computer of the server database, supplying at least part of the auxiliary data as part of the first data sets to the computer of the vehicle, wherein said at least part of the auxiliary data includes a confidence level generated by the computer of the server database.

9. The method according to claim 8, comprising:
    when a first data set transferred to the computer of the vehicle contains data about the location that is represented by the confidence level that is low, increasing a number of vehicles passing the location, each of said vehicles performing said collecting the ambient data sets to thereby increase an amount of overall collected data and forwarding the third data sets to the computer of the server database to thereby increase the confidence level during said modifying the pre-stored data sets.

10. The method according to claim 8, comprising:
    when a first data set transferred to the computer of the vehicle contains data about the location that is represented by the confidence level that is low, triggering a rescan of objects at said location with the at least one of the vehicular sensors to thereby form the third data sets that includes auxiliary data with increased confidence level.

11. The method according to claim 8, comprising:
    when a first data set transferred to the computer of the vehicle contains data about the location that is represented by the confidence level that is high, decreasing occurrence of said collecting ambient data sets to thereby decrease network traffic and processing power required at the vehicle and the server database.

12. The method according to claim 1, wherein said generating third data sets, with the computer of the vehicle, includes generating auxiliary data that contain a confidence level characterizing object data in the third data sets, wherein said confidence level has been determined by the computer of the vehicle based on at least one of: equipment of the vehicle, a travelling speed of the vehicle, a number of measurements performed during said collecting the ambient data sets at the vehicle with the use of at least one vehicular sensor, a number of images formed as a result of said collecting, and a signal to noise ratio of said measurements.

13. The method according to claim 10, wherein said confidence level has been determined based on at least one of: weather condition during said collecting, visibility conditions during said collecting, light conditions during said collecting, shadows, and blinding.

14. The method according to claim 1, wherein said server database is hosted by at least one stationary server or by a cloud-based infrastructure or a combination of said at least one stationary sever and the cloud-based infrastructure, each of which is external to the vehicle.

15. The method according to claim 1, wherein said collecting ambient data sets at the vehicle with the use of at least one vehicular sensor includes using at least one of a CCD sensor, an infrared sensor, a laser scanner, an ultrasound transducer, a radar sensor, a radiofrequency (RF) channel, and an auxiliary environmental sensor.

16. The method according to claim 1, comprising:
with the use of the server database and prior to said modifying the pre-stored data sets in the tangible storage of the server database, correlating the location information in the stored data with at least one of satellite image information and precision position information available for at least one of the road objects specified by the driving-relevant object data.

17. A server database comprising:
a tangible storage that contains pre-stored data sets with driving-relevant object data including location information and object-based information about at least one of said driving-relevant objects including at least one of a road object, a road furniture object, and a geographical object;
a computer of the server database, said computer configured
to generate first data sets from said pre-stored data sets, wherein the first data sets are sub-sets of the pre-stored data sets and represent at least one of a path section of a vehicle path that includes a corresponding location, a specific time or time interval pre-determined for collection of ambient data with a sensor of the a vehicle, and wherein each of the first data sets includes driving-relevant object data, wherein the sub-sets include driving-relevant object data and
to identify a plurality of path sections of the vehicle path that at least partially overlap with one another;
means for transferring the first data sets to a vehicle;
the server database configured to store a selection of output data sets, wherein output the data sets have been generated at the vehicle and received by the server database and include at least differences between the object-based information contained in the ambient data collected along said path sections that at least partially overlap with one another;
the server database configured to generate at least one group of objects in each of said path sections that at least partially overlap with one another by grouping together related objects identified in such path sections, to perform matching location information of the at least one group of objects with location information of groups of objects comprising the same related objects of other output data sets from the selection, and to match said path sections that at least partially overlap with one another by aligning the groups of object between the path sections;

the server database having means for statistical evaluation and post-processing of the output data sets and the pre-stored data sets and modifying the pre-stored data sets in the tangible data storage based on results of evaluation and processing.

18. A vehicle comprising:
means for transferring information about at least one of an area of interest and a vehicle path to a remote server database and for receiving first data sets comprising driving-relevant object data, such driving-relevant object data further comprising at least location information and detailed object-based information characterizing at least one of a road object, a road furniture object and a geographic object under at least one of the following conditions: a) within the at least one of the area of interest and the vehicle path; at a specific time or time interval; and c) with respect to a specific object;
the vehicle having at least one sensor configured to collect, in operation of the vehicle, at least one ambient data set under said at least one of conditions including i) along path sections, of the vehicle path that includes a location corresponding to said location information, ii) at the specific time or time interval, and iii) with respect to the specific object, the ambient data sets characterizing at least one of the road object, the road furniture object, and the geographic object,
the vehicle having a computer of the vehicle configured
to acquire said ambient data sets from the at least one sensor of the vehicle,
to evaluate the ambient data sets to form an evaluation result,
to generate second data sets based on the evaluation result, each second data set comprising driving-relevant object data,
to generate third data sets that contains at least one of:
differences between the object-based information of the second data sets and the object-based information of the respectively corresponding first data sets related to the path sections that at least partially overlap with one another, and
the object-based information of the second data sets related to the path sections that at least partially overlap with one another, and
means for forwarding the third data sets to an external database.

* * * * *